(12) United States Patent
Heder et al.

(10) Patent No.: US 10,220,906 B2
(45) Date of Patent: Mar. 5, 2019

(54) SYSTEM AND METHOD FOR DETACHABLE BICYCLE HANDLEBARS

(71) Applicant: Billibars LLC, Scottsdale, AZ (US)

(72) Inventors: Trevor Heder, Tempe, AZ (US); Robert Fulbright, Tempe, AZ (US)

(73) Assignee: BillyBars LLC, Sumter, SC (US)

( * ) Notice: Subject to any disclaimer, the term of this patent is extended or adjusted under 35 U.S.C. 154(b) by 0 days.

(21) Appl. No.: 15/472,140

(22) Filed: Mar. 28, 2017

(65) Prior Publication Data

US 2017/0197682 A1    Jul. 13, 2017

Related U.S. Application Data

(60) Provisional application No. 62/314,388, filed on Mar. 29, 2016.

(51) Int. Cl.
*B62K 21/12*   (2006.01)
*F16B 3/00*    (2006.01)
*F16B 7/20*    (2006.01)

(52) U.S. Cl.
CPC .............. *B62K 21/12* (2013.01); *F16B 3/00* (2013.01); *B62K 2206/00* (2013.01); *F16B 7/20* (2013.01)

(58) Field of Classification Search
CPC ........ B62K 21/12; B62K 21/14; B62K 21/16; B62K 2206/00; F16B 3/00; F16B 7/20
See application file for complete search history.

(56) References Cited

U.S. PATENT DOCUMENTS

| | | | |
|---|---|---|---|
| 2,438,657 A | * | 3/1948 | Dufaux .................. B62K 21/16 74/551.5 |
| 3,391,582 A | | 7/1968 | Edward |
| 5,319,994 A | | 6/1994 | Miller |
| 5,737,967 A | | 4/1998 | Hartley |
| 6,035,742 A | | 3/2000 | Hollingsworth |
| 6,263,759 B1 | | 7/2001 | Hollingsworth |

(Continued)

FOREIGN PATENT DOCUMENTS

| | | | | |
|---|---|---|---|---|
| DE | 202013101848 U1 | * | 6/2013 | ............ B62K 21/26 |
| JP | 2006-193059 A | | 8/2013 | |
| WO | 0247963 A1 | | 6/2002 | |

OTHER PUBLICATIONS

DIY Wall Bike Hanger; Wilson, Kyle; May 27, 2002 http://www.upcylethat.conn/handlebar-bike-rack (Year: 2002).*

(Continued)

*Primary Examiner* — Adam D Rogers
(74) *Attorney, Agent, or Firm* — Lisa Foundation Patent Law Clinic at Arizona State University

(57) ABSTRACT

System and method for detachable handlebars and fixing said handlebars onto a mount are presented. Specifically, the handlebars are independent the bicycle and mount; in some arrangements, the handlebar locking shaft may include a non-clamping connection that allows for the handlebars to attach to the bicycle quickly and easily and to prevent the handlebars from sliding, rotating, disengaging, or otherwise moving while a user is on the bicycle. The non-threaded assembly disclosed in accordance with the present invention may generally exploit several compression mechanisms to bias a series of keys into a locking position to secure the handlebars attachment to the bicycle or mount. Other embodiments are also included.

13 Claims, 35 Drawing Sheets

(56) References Cited

U.S. PATENT DOCUMENTS

| | | | |
|---|---|---|---|
| 6,359,614 B1 | 3/2002 | McVicar | |
| 7,013,533 B2 | 3/2006 | Lumpkin | |
| 8,806,981 B2 | 8/2014 | Wu | |
| 8,887,357 B2 | 11/2014 | Jimenez | |
| 9,090,306 B2 * | 7/2015 | Wang | B62K 15/008 |
| 2013/0344977 A1 | 12/2013 | Chalifoux | |
| 2016/0325798 A1 | 11/2016 | McPherson | |
| 2016/0347398 A1 * | 12/2016 | Wang | B62K 21/16 |

OTHER PUBLICATIONS

Retrofit Folding Hanldebars; Wentworth, Joe; Jun. 16, 2008 http://www.tuvie.com/retrofit-folding-handlebars/ (Year: 2008).*

* cited by examiner

SYSTEM AND METHOD FOR DETACHABLE BICYCLE HANDLEBARS

CROSS-REFERENCES TO RELATED APPLICATIONS

This application claims the benefit of U.S. Provisional Patent Application No. 62/314,388, filed Mar. 29, 2016 which is herein incorporated entirely by reference.

BACKGROUND OF INVENTION

People have been using bicycles as a means for transportation for hundreds of years. Bicycling is easy to learn for people of all ages, and because it doesn't require fuel, or emit exhaust, it is a clean, accessible activity that anyone can do. But for many, bicycling is not just a means for transportation, people ride for fun, to work out, to compete, or for no reason at all. Because bicycling has become such a ubiquitous activity, the industry has responded by developing a wide array of customizable bicycle technology. For example, the industry has seen advancement in bicycle handlebar design, automatically adjustable bicycle seats, and the integration of smart computing into a bicycle frame. In addition, finding storage space for bicycles can be an uphill battle; people living in urban environments like the convenience of a bicycle but don't want to give up valuable space in their home when the bicycle is brought inside. To illustrate, conventional bicycle handlebars are bulky and create storage issues because of their extended profile.

So as to reduce the complexity and length of the Detailed Specification, and to fully establish the state of the art in certain areas of technology, Applicant herein expressly incorporates by reference all of the following materials identified in each numbered paragraph below.

U.S. Pat. No. 6,263,759 provides one attempt to allow a user to change out their bicycle handlebars, by using a rigid clamping device to couple a bicycle handlebar shell to a stem portion. Specifically, the assembly has an inner rigid shell with outwardly extending protrusions at each end. A pair of rigid clamps pass over the outwardly extending protrusions and tighten against the handlebars to hold the grip assembly in place.

U.S. Pat. No. 3,391,582 discloses a removable handlebar affixed to a bicycle frame via a bracket member. The bracket member comprises a curved plate disposed around the handlebar such that the ends of the plate cooperate with a separate plate affixed to a bicycle. The handlebar is further secure to the plate by means of a bolt which must be fastened and unfastened to lock and unlock the handlebar.

DE Patent No. 202013101848U1 discloses a design for a quick-release handlebar grip of a bicycle by means of a c-shaped clamp. The c-clamp fastens interlocking clamping lips together via screw.

U.S. Pat. No. 6,035,742 discloses a handlebar grip assembly. The handlebar grip assembly has a series of inner interlocking inner tubes that are configured to engage with an outer hand contacting portion.

U.S. Pat. No. 7,013,533 discloses a cycle grip adherence device. Specifically, a bicycle grip is attached to a handgrip shell via a band clamp.

Applicants believe that the material incorporated above is "non-essential" in accordance with 37 CFT 1.57, because it is referred to for purposes of indicating the background of the invention or illustrating the state of the art. However, if the Examiner believes that nay of the above-incorporated material constitutes "essential material" within the meaning of 37 CFR 1.57(c)(1)-(3), Applicants will amend the specification to expressly recite the essential material that is incorporated by reference as allowed by the applicable rules.

SUMMARY OF THE INVENTION

In various representative aspects, some implementations comprise, among other things, a bicycle handlebar coupling mechanism comprising, a bicycle, a stem portion, and a handlebar portion. In some embodiment, the device includes a locking shaft extending from the handlebar and rotationally disposed at least partially within a hollow cylindrical receiver. The locking shaft is configured to translate horizontally along a longitudinal axis as well as rotate about that axis. The locking shaft has a locking mechanism extending from the shaft; the locking mechanism is configured to transition the invention between a locked and unlocked configuration. The hollow cylindrical receiver has a receiving port configured to receive the locking shaft and the locking shaft mechanism, and a receiving slot extending along the hollow cylindrical receiver at least a portion of its length. A first compression mechanism is disposed around at least a portion of the locking shaft. The first compression mechanism is configured to keep the shaft engaged with the stem portion so that the shaft is inhibited from unwanted movement.

Although the handlebar coupling mechanism may be referred to in the singular, it should be known that the handle bar coupling mechanism also refers to a second handle bar assembly that mirrors the first assembly.

In one embodiment, the first compression mechanism is a compressible gasket disposed around at least a portion of the locking shaft and surrounded by at least one flexible ring. Specifically, the compressible gasket has an expanded configuration and a compressed configuration, and when the compressible gasket is in the compressed positioned its edges engage with the receiving shaft. This measure further increases the handlebars stability, since as a result, the anchoring members expand upon a user forcing the handlebar into the hollow cylindrical receiver so that the anchor grips the hollow cylindrical receiver preventing unwanted movement.

In another exemplary embodiment, the first compression mechanism comprises a compressible gasket disposed around the locking shaft.

In another exemplary embodiment, the first compression mechanism comprises a compressible gasket and a compressible washer, both of which are disposed around the locking shaft.

In another exemplary embodiment, the first locking mechanism is a clamp pin extending through the clamp opening positioned on the locking shaft.

In another exemplary embodiment, the locking mechanism is a series of keys positioned on the locking shaft and configured to be received by the receiving slots of the receiving shaft.

Implementations of a method for attaching and detaching removable bicycle handlebars to a bicycle may comprise of attaching and detaching removable handlebars of a bicycle includes inserting a locking shaft into a receiving shaft such that a first key and a second key positioned on the locking shaft pass through a key seat of a shaft collar the user then biases the shaft collar towards the locking crown such that a compression spring is compressed. The locking shaft is axially rotated about a first axis to align an anti-rotation tab with a locking groove of the shaft collar; at least partially decompressing the compression spring such that the locking groove engages the anti-rotation tab. To detach the locking shaft from the receiving shaft, bias the locking groove portion of the shaft collar away from the anti-rotation tab and axially rotate the locking shaft about the first axis and moving the locking shaft radially along said axis such that the locking shaft is moved out of the stem portion.

Also, described in this specification are systems and methods for selectively coupling and decoupling handlebars on a bicycle. This summary is not intended to limit the scope of the claims in anyway, but is intended to provide a simplified overview of the instant invention. These and other preferred embodiments of the instant invention will be described below.

Aspects and applications of the inventions presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of post-AIA 35 U.S.C. § 112(f). Thus, the use of the words "function," "means" or "step" in the Detailed Description or Description of the Drawings or claims is not intended to somehow indicate a desire to invoke the special provisions of post-AIA 35 U.S.C. § 112(f), to define the invention. To the contrary, if the provisions of post-AIA 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of post-AIA 35 U.S.C. § 112(f). Moreover, even if the provisions of post-AIA 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

In the following description, and for purposes of explanation, various aspects of the present invention may be described in terms of functional block components and various steps. Such functional blocks may be realized by any number of components configured to perform the specified functions and achieve the various results. In other instances, known structures and devices are shown or discussed more generally in order to avoid obscuring the invention. In many cases, a description of the operation is sufficient to enable one to implement the various forms of the invention. Thus, it should be noted that there are many different and alternative configurations, devices and technologies to which the disclosed inventions may be applied. The full scope of the invention is not limited to the examples that are described below.

Figure 1:
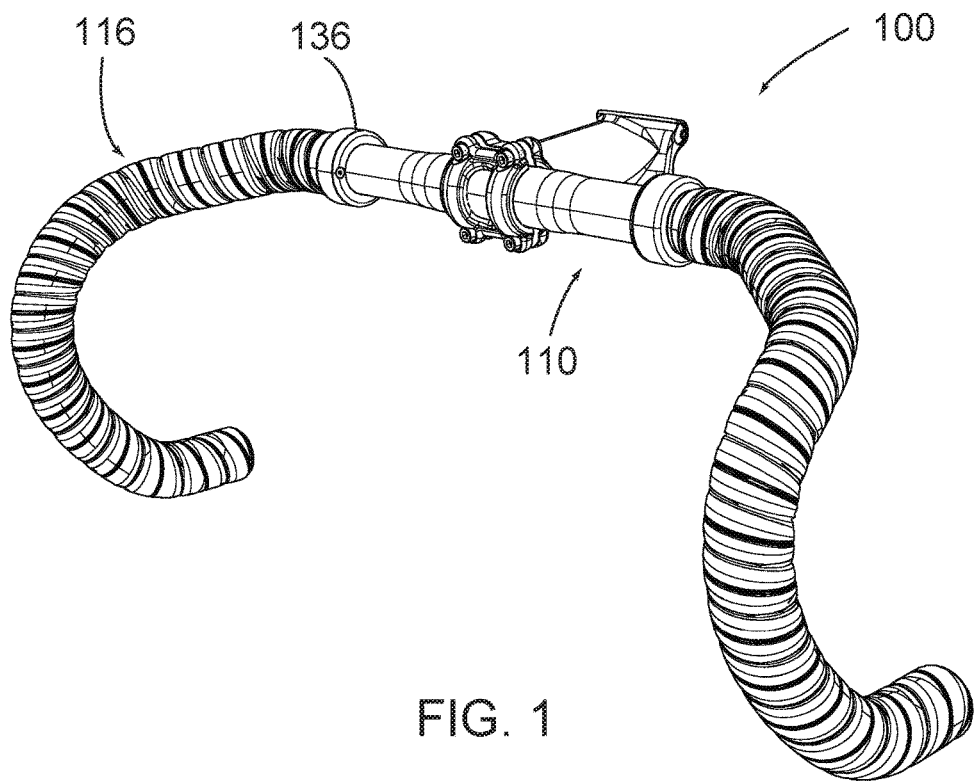
FIG. 1 representatively illustrates an isometric view of an implementation of a detachable handlebar.
Figure 2:
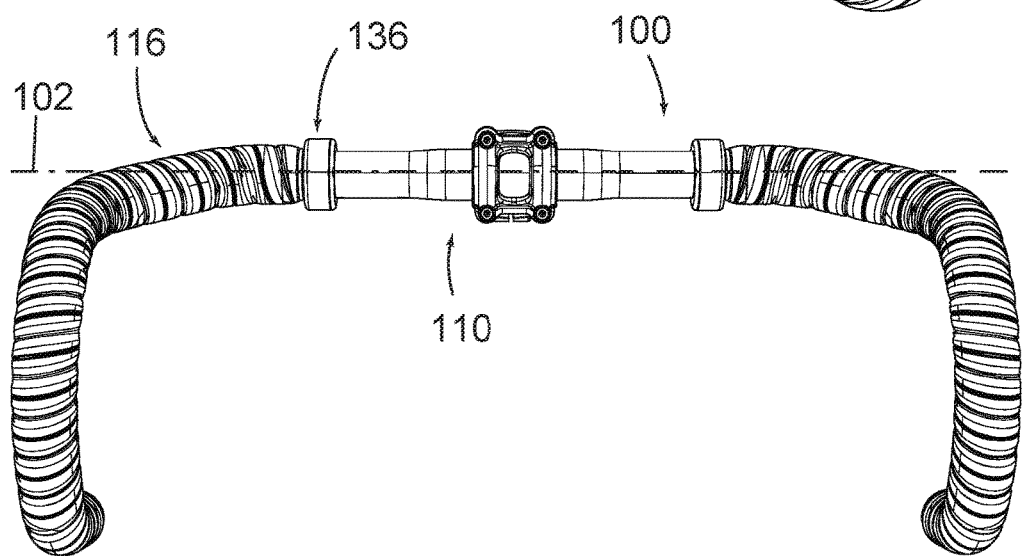
FIG. 2 depicts a front view of an implementation of the detachable handlebar unit.

FIGS. 1-2 illustrates an exemplary embodiment of a detachable handlebar unit 101 of a detachable handle bar system 100 along a first, longitudinal axis 102. In a non-limiting exemplary embodiment, a detachable handlebar system 100 includes a hollow cylindrical receiver 110, and a hollow cylindrical receiver opening 112 at either end of the hollow cylindrical receiver 110 through which a handlebar 116 protrudes or retracts from. In addition, the detachable handlebar unit 101 may further comprise a bar clamp mechanism 114 disposed around the hollow cylindrical receiver opening 112 of the hollow cylindrical receiver 110, wherein a bar clamp mechanism 114 is removable coupled to the upper edge of the hollow cylindrical receiver opening 112 such that the handlebar 116 is substantially coupled to the hollow cylindrical receiver 110. In the embodiment depicted, the hollow cylindrical receiver 110 is depicted as one solid component. However, it is contemplated that the entire hollow cylindrical receiver 110 can be constructed out of multiple components; for example, the hollow cylindrical receiver 110 could comprise a left and a right cylindrical receiver or more than two separable pieces. In addition, although it is called a hollow cylindrical receiver 110, it may be manufactured as a variety of different shapes (e.g. hexagonal, square, etc.). Additionally, the handlebar 116 in FIGS. 1-2 are depicted as "dropbar" handlebars, but it should be known to a person of ordinary skill in the art that the handlebar 116 type may be comprised in other forms without departing from the disclosure.

The diameter of the hollow cylindrical receiver opening 112 is selected to optimally fit the diameter of the bar clamp mechanism 114, thus in some non-limiting embodiments the hollow cylindrical receiver 110 may have tapered ends. The handlebars 116 in the embodiment show are located opposite each other so that a user can grip them and operate them just as they would a conventional bicycle.

In all the embodiments of this disclosure many or all of the components of the detachable handlebar unit 101 or the detachable handlebar system 100 can be made of metals and metal alloys, while other can be made out of rigid and resilient polymer materials. Alternatively, the components can be made of flexible, resistant polymer materials. It may be desirable for the components of the detachable handlebar unit 101 to be made out of metal, metal alloys, or both, because their strength and resilience to outdoor environments is ideal for a bicycle application. The metal components may be manufactured using conventional or unconventional techniques such as machining, molding, casting, or laser fusing. Polymer components can be manufactured using various techniques as well.

Figure 3:
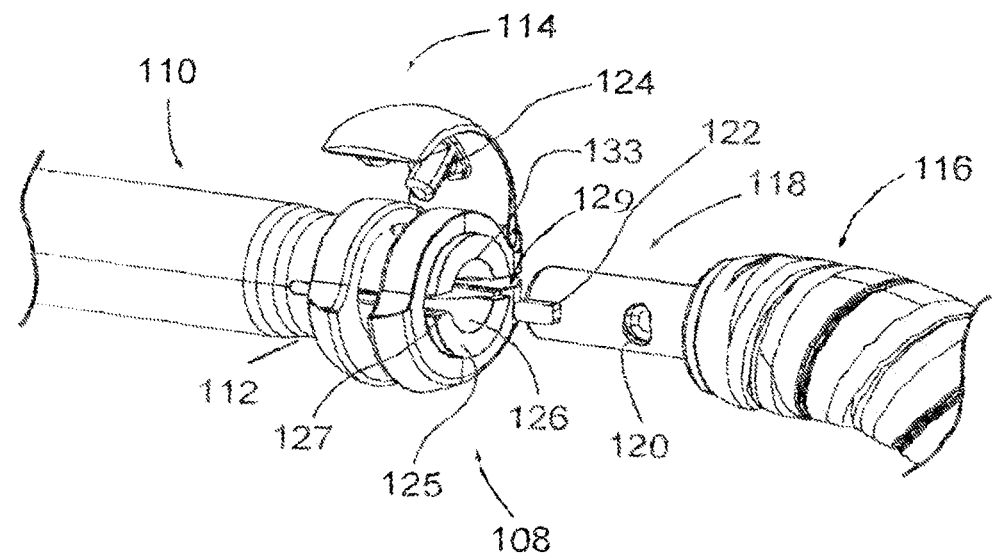
FIG. 3 depicts an implementation of a hollow cylindrical receiver, handlebar portion, bar clamp, and locking crown
Figure 4:
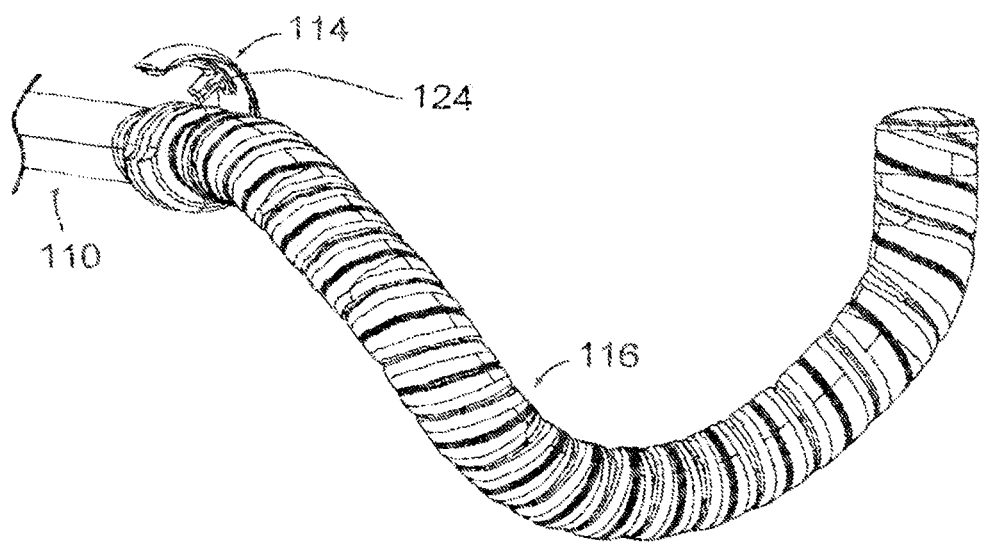
FIG. 4 depicts a rotated side view of an implementation of the detachable handlebar unit with the bar clamp disposed around the handlebar portion and the stem portion.

FIGS. 3-4 provide an exemplary embodiment of an assembly of internal operational mechanisms 108 that provide for the connection of the hollow cylindrical receiver 110 of the stem portion 104 (depicted in FIG. 26), to the handlebars 116 of the handlebar portion 106 in conjunction with the bar clamp 114. The handlebar 116 comprises a locking shaft 118 extending outward from the handlebar 116 along the longitudinal axis 102. The length of the locking shaft can vary from bicycle to bicycle and may be used to set an optimal length for the bicycle. For example, children's bicycles may have a locking shaft that is a smaller than adult bicycles. The locking shaft 118 further comprises a clamp opening 120 and a second key 122, such that the locking shaft 118 can be inserted into both the bar clamp 114, and the hollow cylindrical receiver 110. The locking shaft 118 may also comprise a first key 123 positioned on the locking shaft 118.

In this embodiment, the bar clamp 114 comprises a clamping pin 124, a locking crown 125, and a receiving shaft 126, such that when the locking shaft 118 is inserted into the bar clamp 114, the second key 122 passes through a locking crown opening 133 of the locking crown 125, the first receiving slot 127, and the second receiving slot 129 (depicted in FIG. 3) of the receiving shaft 126 thereby allowing the clamping pin 124 of the bar clamp 114 to pass through the clamping pin opening 120 when the bar clamp 114 is fastened. Other variations of the clamping pin 124 can include different sizes, geometric shapes, and numbers of clamping pins 124. To illustrate, the bar clamp 114 may comprise a square clamping pin 124 or of a larger or smaller diameter than shown. Additionally, the bar clamp could comprise two clamping pins 124 that are received by two clamping pin openings 120. The receiving shaft may comprise a duplicate key and receiver slot system. It is also contemplated that other embodiments of the disclosure may vary greatly in size, to be suitable for a wide variety of uses.

The length of the receiving shaft may also vary from bicycle to bicycle just like the locking shaft 118. It should be known that the receiving shaft can function with both sets of receiving slots or only one set of receiving slots.

Figure 5:
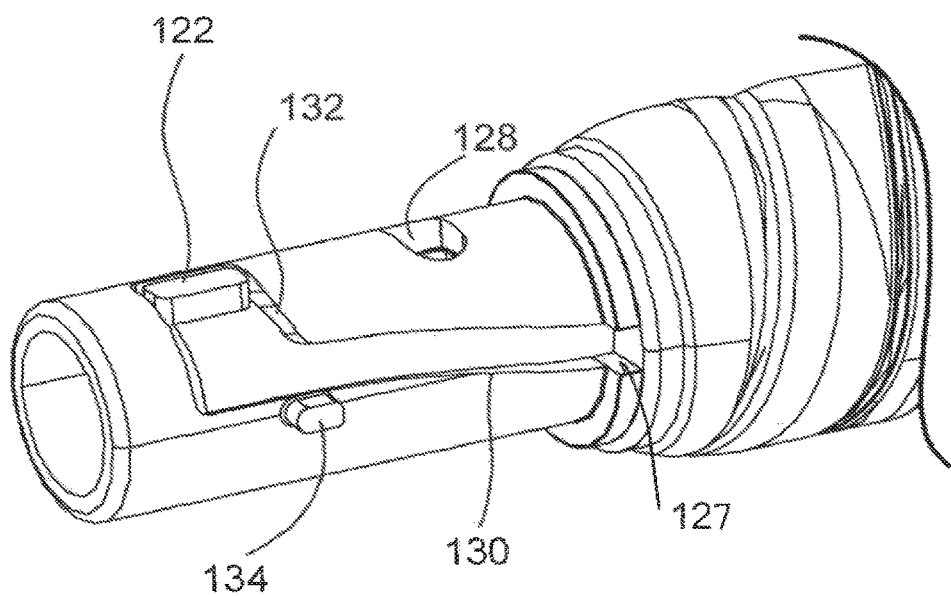
FIG. 5 depicts a close up view of an implementation of the handlebar portion.
Figure 6:
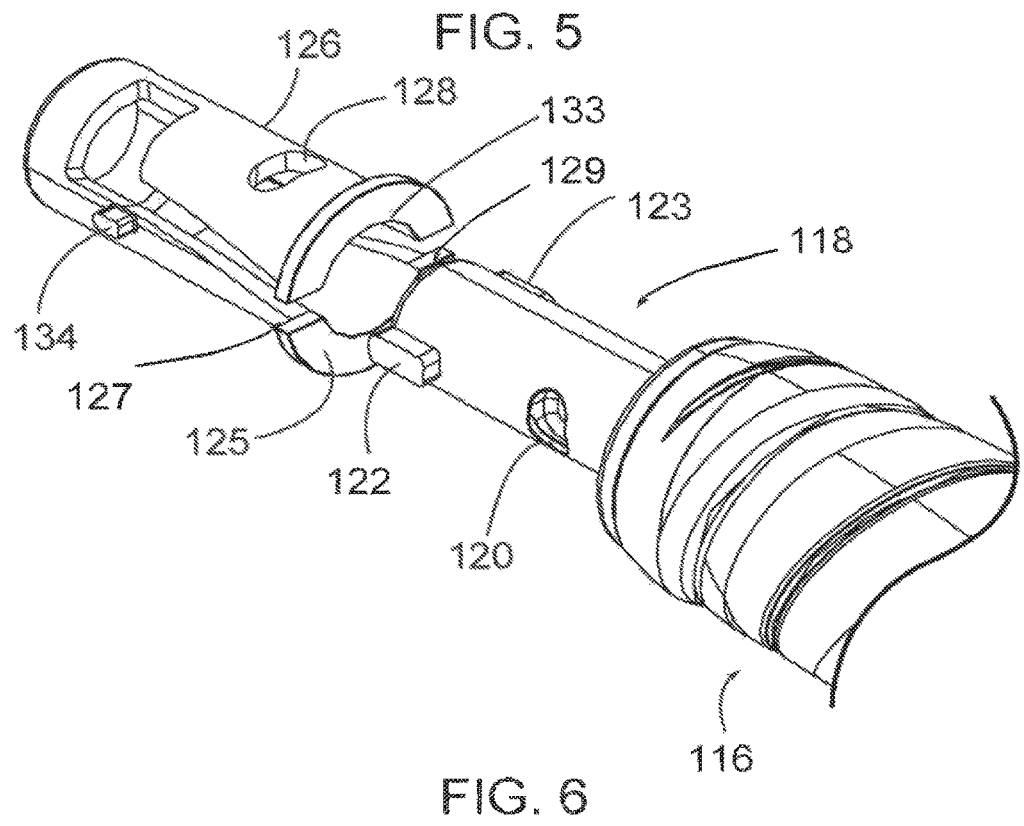
FIG. 6 depicts an implementation of the handlebar portion and a receiving shaft.

In accordance with the present invention, assembly and disassembly of the locking shaft 118 and the receiving shaft 126 is shown in FIG. 5-6. In this non-limiting embodiment, the locking shaft 118 is configured to slide through the locking crown opening 133 of the locking crown 125 and the receiving shaft 126 via the second key 122 sliding through the first receiving slot 127 and the second receiving slot 129 (depicted in FIG. 6) of the receiving shaft 126. It should be known that the locking shaft 118 may be completely or partially hollow. However, it is also contemplated that the locking shaft 118 can be completely solid in other embodiments such that the manufacturing process or user prefers a heavier composition. In this configuration, when the locking shaft 118 is inserted into the receiving shaft 126 the clamping pin opening 120 is configured to align with the clamping pin cavity 128 of the receiving shaft 126. This embodiment further comprises an anchoring pin 134 positioned on the receiving shaft 126 that is configured to engaged with the hollow cylindrical receiver groove 135 (depicted in FIG. 5) such that the receiving shaft 126 may not rotate along a circumference of the longitudinal axis 102.

Figure 7:
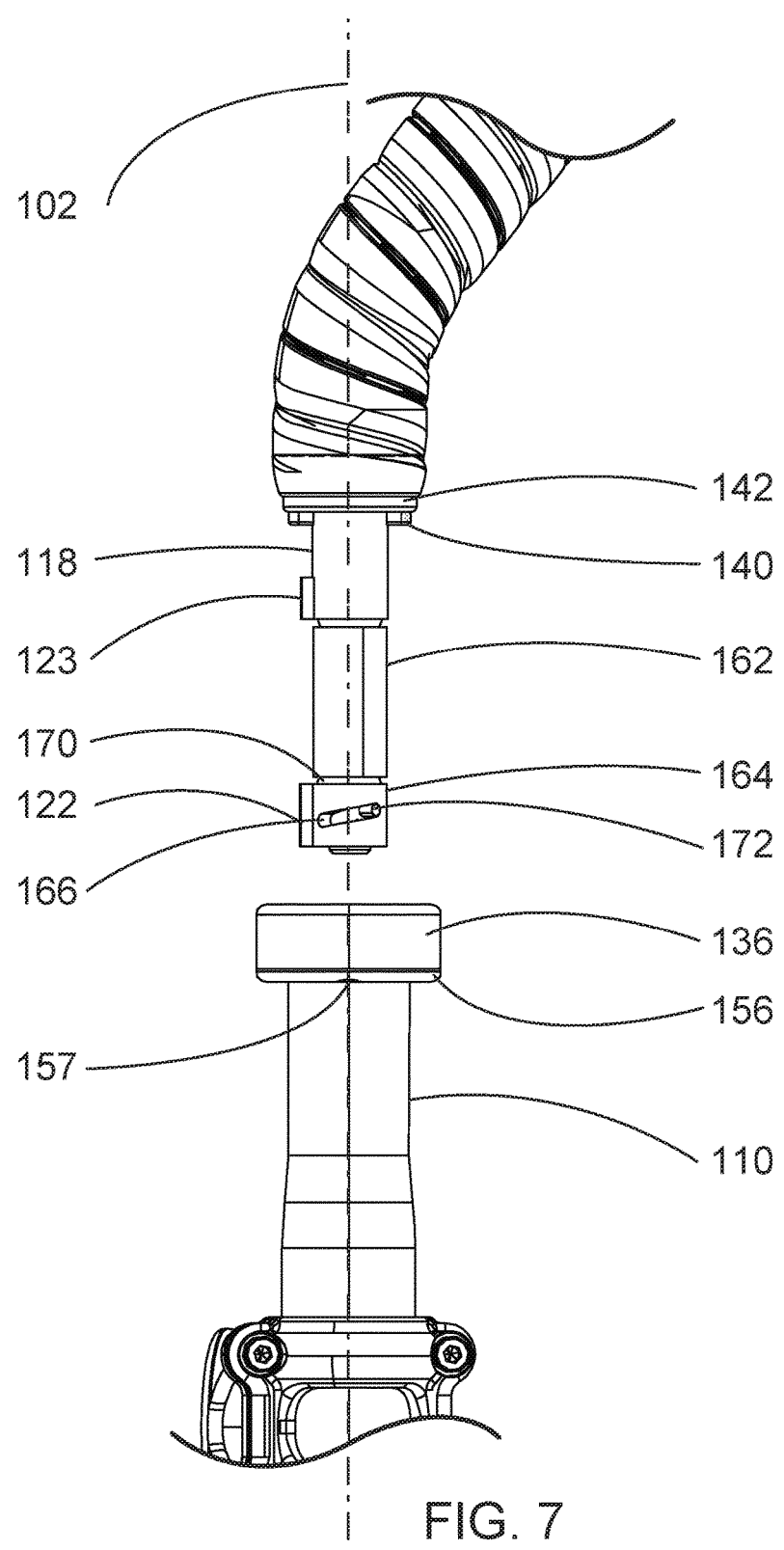
FIG. 7 depicts a side view of an implementation of the detachable handlebar unit.
Figure 8:
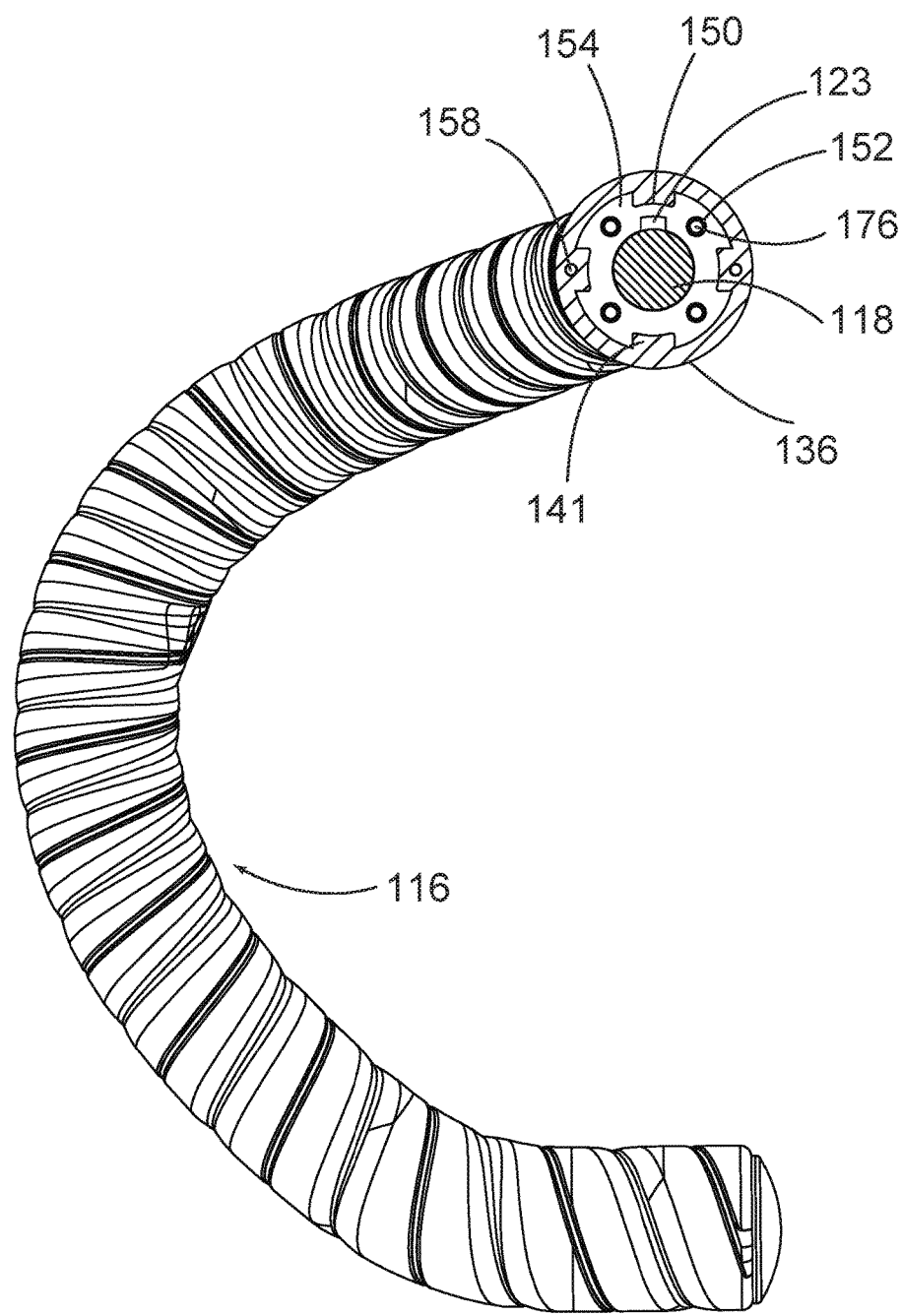
FIG. 8 depicts a cross section of an implementation of the detachable handlebar unit

FIGS. 7-8 demonstrate one configuration of the detachable handlebar unit 101. In this embodiment, the bar clamp 114 is fastened so that the handlebar 116 is coupled to the hollow cylindrical receiver 110. Specifically, the locking shaft 118 is inserted into the receiving shaft 126 via the locking crown opening 133 (as seen in FIG. 6). The receiving shaft 126 is disposed within the hollow cylindrical receiver 110. In one embodiment, the locking shaft 118 comprises a first key 123, a second key 122, (depicted in FIG. 6) and a clamping pin opening 120. The first key 123 and the second key 122 are configured to slide through the locking crown 125, the first receiving slot 127, the second receiving slot 129 (depicted in FIG. 6), the third receiving slot 130, and the fourth receiving slot 132 (depicted in FIG. 6) such that the first key 123 and the second key 122 rest in the second receiving slot 129 and the fourth receiving slot 132, respectively. When the locking shaft 118 is inserted into the receiving shaft 126 the clamp opening 120 is aligned with the clamping pin cavity 128 such that both are unimpeded. In addition, the clamping pin 124 is disposed within the clamping pin cavity 128 and the clamp opening 120 when the bar clamp 114 is fastened. It is also contemplated that the clamping pin 124 can have a coated surface or a creased surface. A benefit to coating the clamping pin 124 is that the increase of friction resulting from the coating may prevent the bar clamp 114 from unintentionally disengaging. An aspect of this disclosure is that one or all of the assembly of internal operational mechanisms 108 can have a coated surface or a creased surface such that provide substantially the same functionality without departing from the disclosure. In addition, the clamping pin 124 could comprise a different geometric dimension. For example, the clamping pin 124 shown in FIG. 3 has a cylindrical shape, however it is contemplated that it may have a square profile or a rectangular one.

Figure 9:
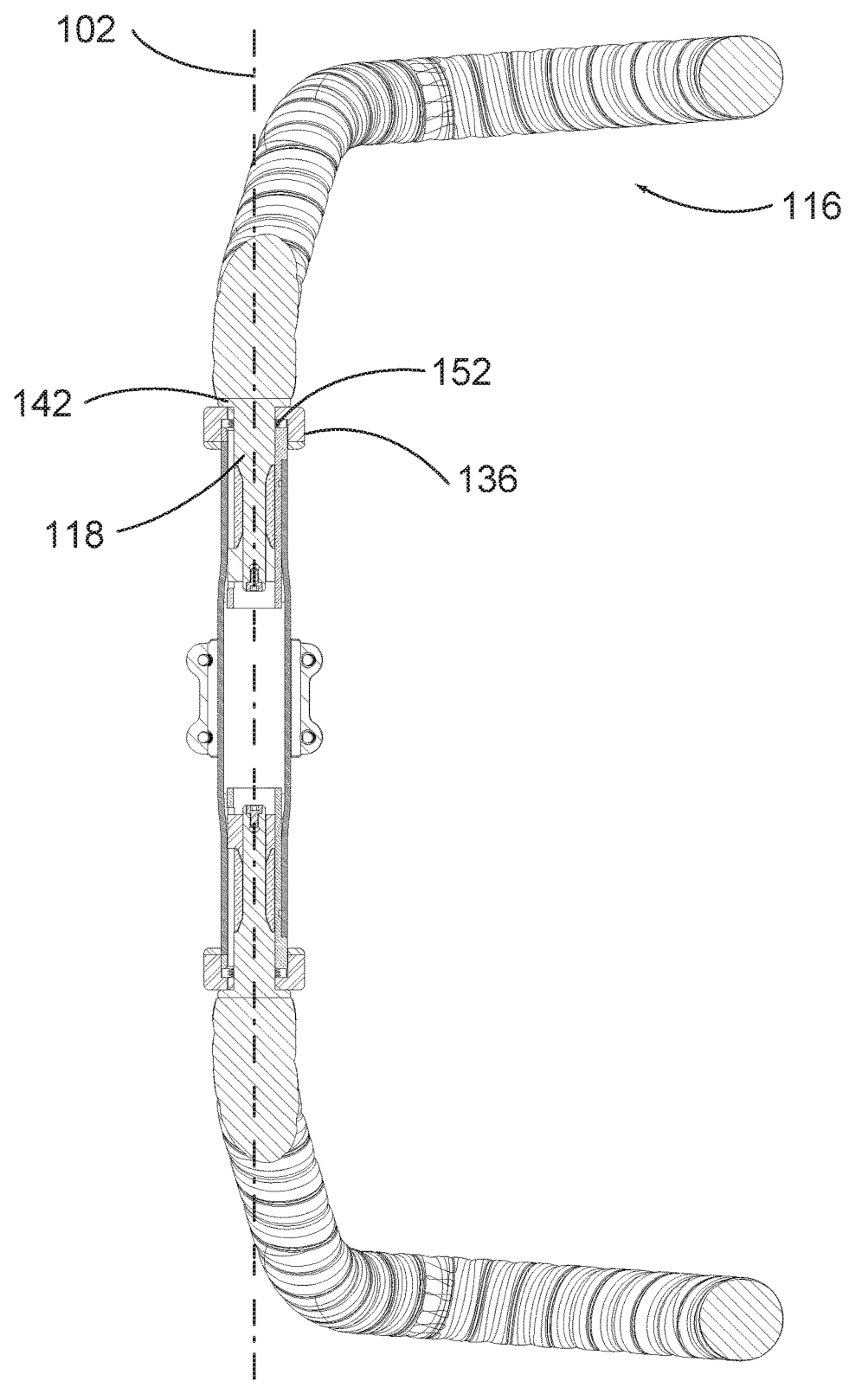
FIG. 9 depicts an implementation of a detachable handlebar unit
Figure 10:
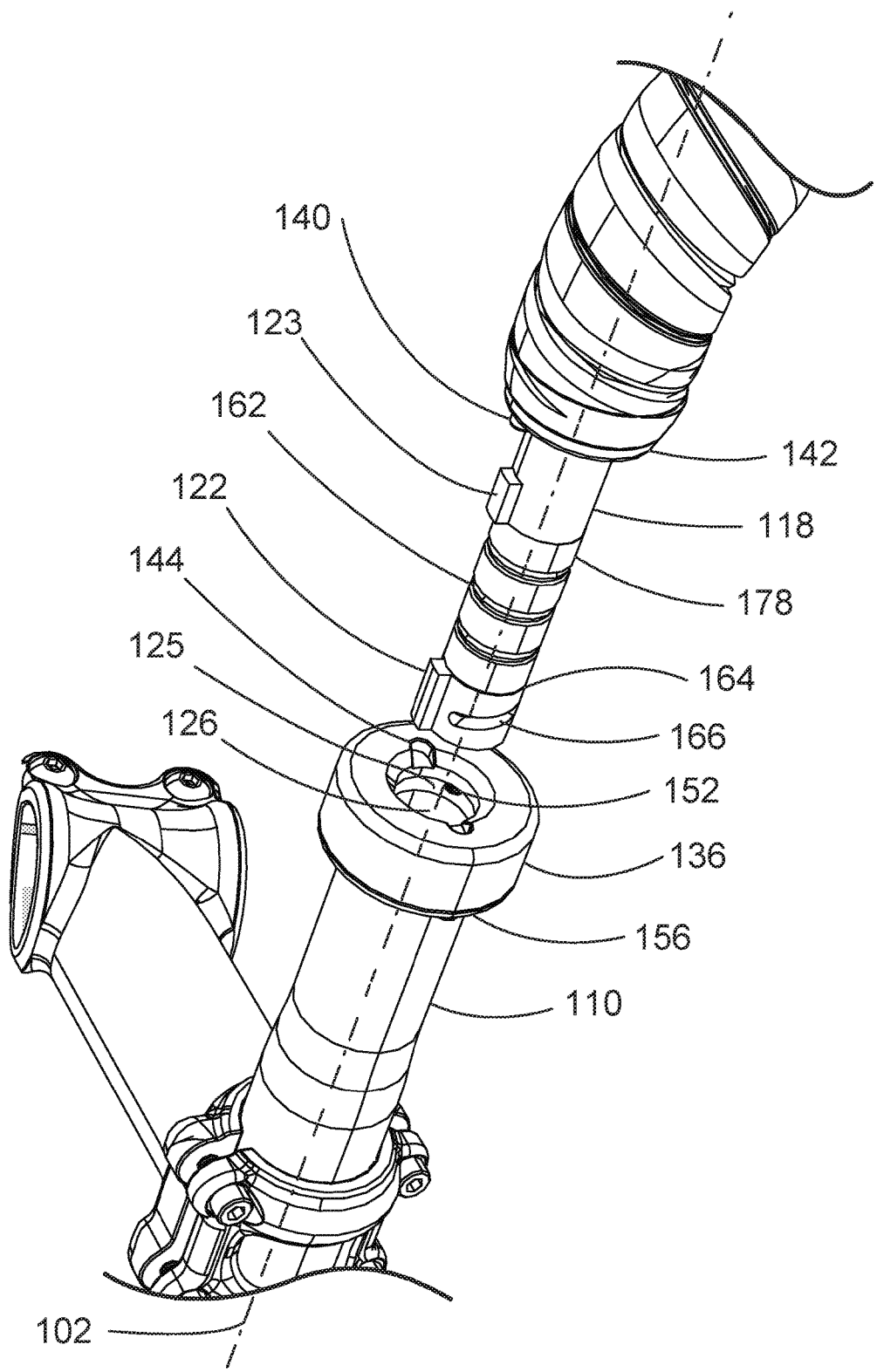
FIG. 10 depicts a front view of an implementation of a detachable handlebar unit.

FIGS. 9-10 illustrate an exemplary embodiment of the detachable handlebar unit 101 of the detachable handlebar system 100. In this non-limiting embodiment, the detachable handlebar unit 101 comprises a shaft collar 136 which is configured to couple the handlebar 116 to the hollow cylindrical receiver 110.

Figure 11:
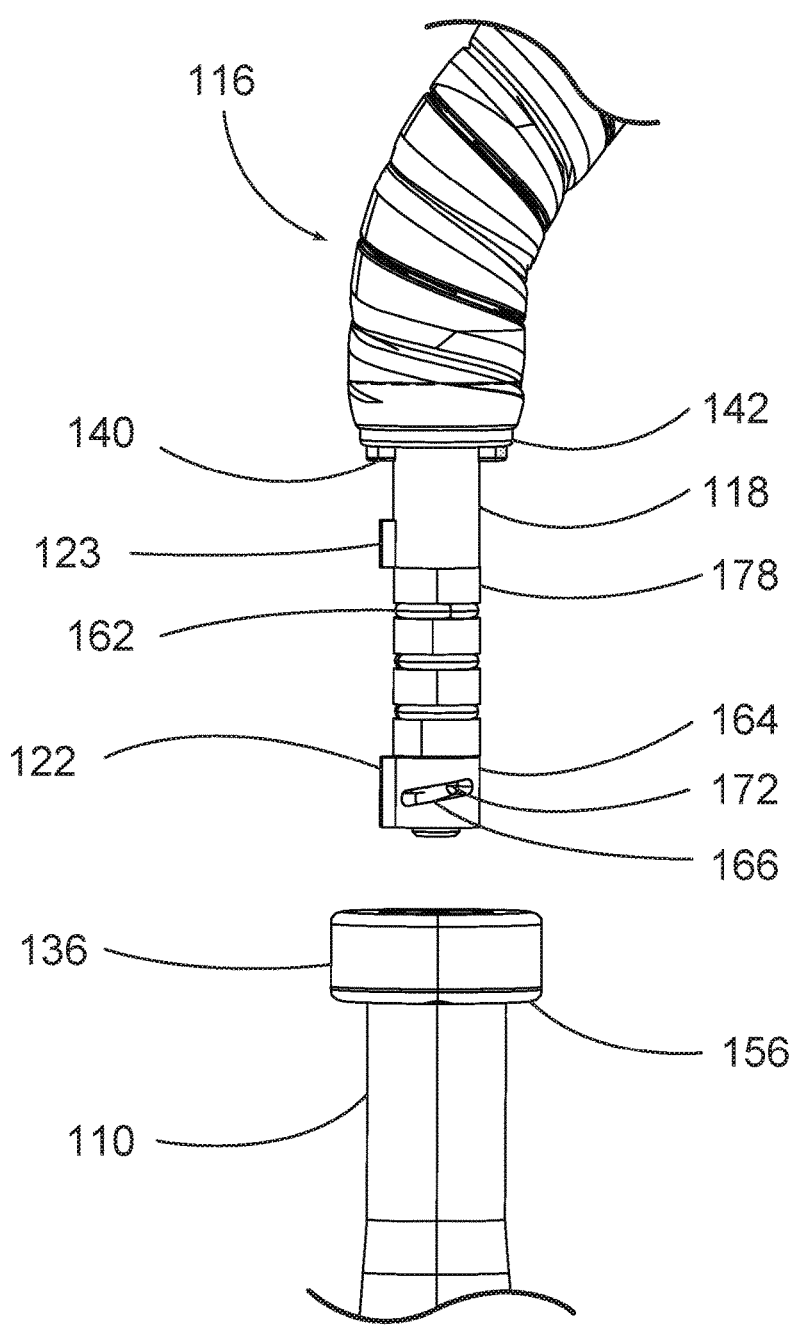
FIG. 11 depicts an implementation of a handlebar portion, the hollow cylindrical receiver, and the shaft collar.

FIG. 11 demonstrates one configuration of the exemplary embodiment of FIGS. 9-10. In this non-limiting embodiment, the detachable handlebar unit 101 comprises a shoulder 142 positioned proximate a locking shaft base 119 of the locking shaft 118 wherein at least one anti-rotation tab 140 extends outward from the shoulder 142 along the longitudinal axis 102. In this embodiment, the locking shaft 118 extends from the shoulder 142 along a longitudinal axis 102. However, the locking shaft 118 may extend from the shoulder 142 in an elbow like configuration. In response, the shoulder 142 and the anti-rotation tabs 140 may also conform with this composition. Additionally, in another embodiment, the anti-rotation tab 140 may extend outward from the locking shaft 118 perpendicular to the longitudinal axis 102. In one embodiment, such an anti-rotation tab 140 is configured to couple with a locking groove 144 of the shaft collar 136. Furthermore, the shaft collar 136 may have one or more locking grooves 144 that correspond to one or more anti-rotation tabs 140 which secure the handlebar 116 to the shaft collar 136 and prevent the handlebar 116 from rotating when the locking shaft 118 is completely engaged with the receiving shaft 126 (depicted in FIG. 12).

Figure 12:
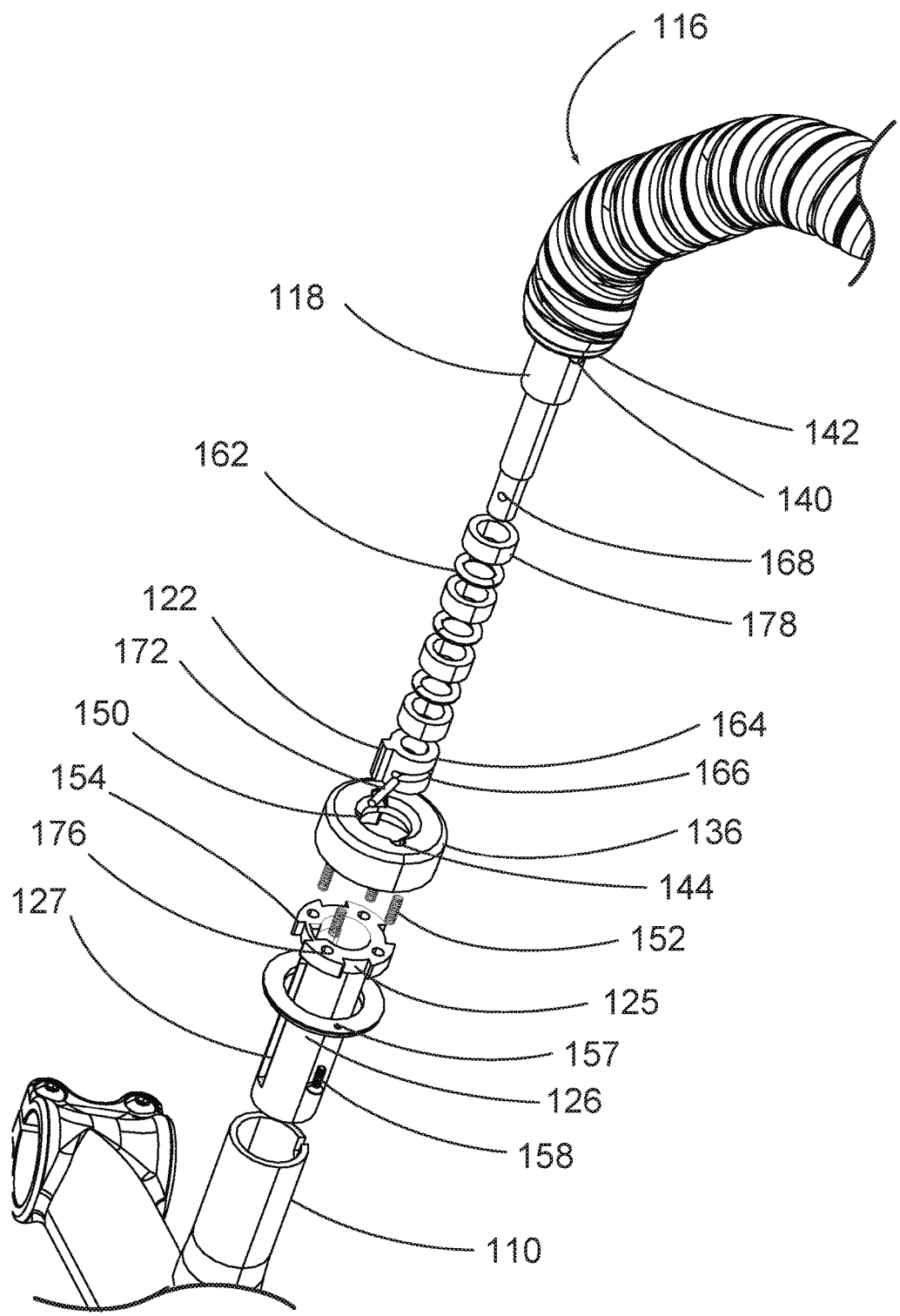
FIG. 12 depicts an implementation of a handlebar portion, shaft collar, locking crown, receiving shaft, tubular compression fitting, threaded insert, and shaft collar screw.

FIG. 12 demonstrates a further configuration of the exemplary embodiment of FIGS. 9-10. In this non-limiting embodiment, the detachable handlebar unit 101 comprises a locking crown 125, a receiving shaft 126, a tubular compression fitting 148, a back plate 156, and a threaded insert 146. When the detachable handlebar unit 101 is in normal operation, the shaft collar is configured to couple with the locking crown 125, the locking crown is configured to couple with the receiving shaft 126, the receiving shaft 126 is configured to couple with the tubular compression fitting 148, and the tubular compression fitting is configured to couple with the threaded insert 146. This embodiment further comprises a back plate screw hole 157 and a back plate screw 158. The tubular compression fitting 148 may be able to compress and expand so that it permits the anti-rotation tabs 140 to engage with the locking grooves 144 of the shaft collar 136. In another non-limiting embodiment, the tubular compression fitting 148 may have a rigid composition.

Figure 13:
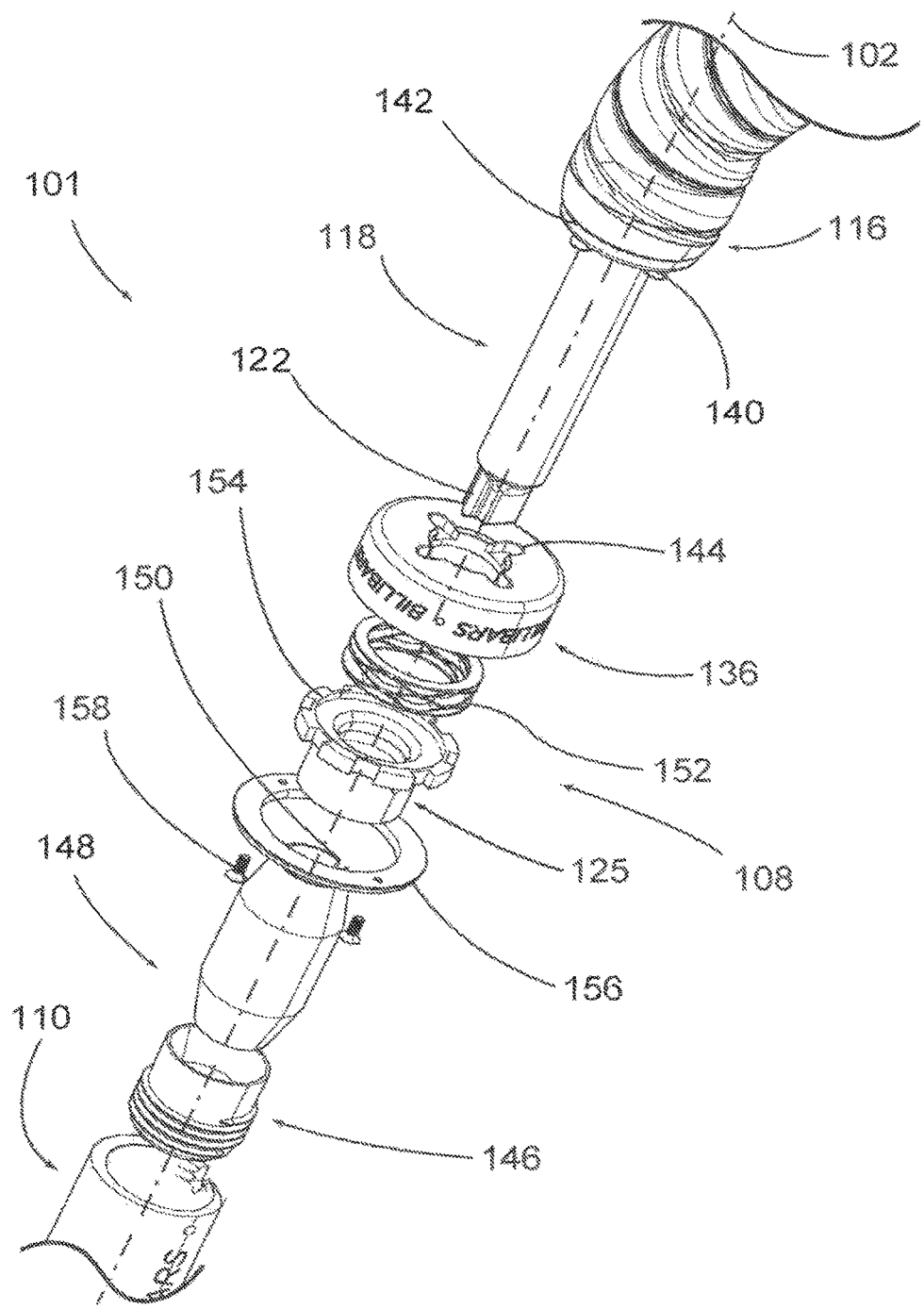
FIG. 13 depicts an exploded view of an implementation of the hollow cylindrical receiver, handlebar, shoulder, anti-rotation tab, shaft collar, back plate, back plate screw and assembly of internal operational mechanisms.
Figure 14:
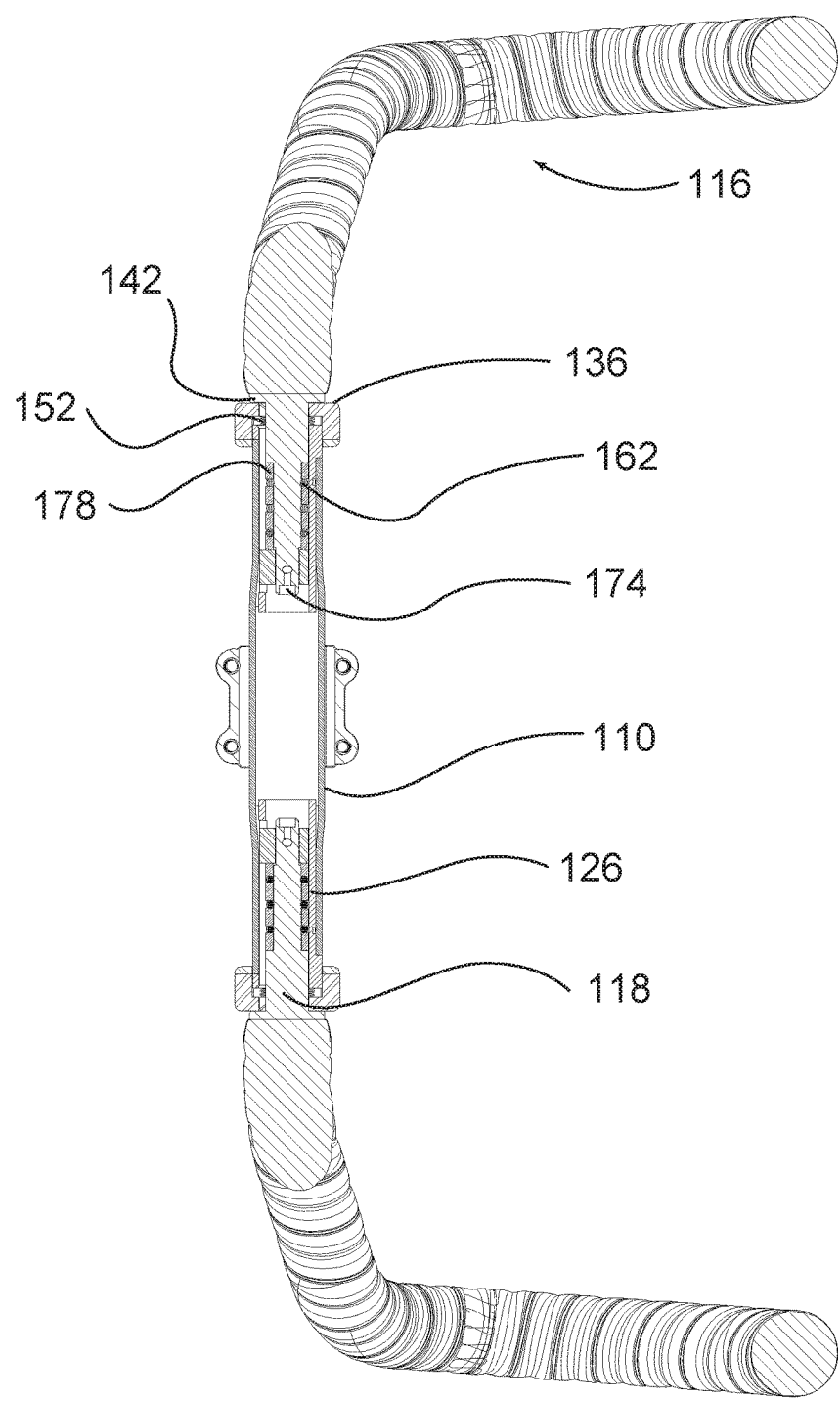
FIG. 14 depicts a top view of FIG. 12 as well as an implementation of a locking crown notch.

FIGS. 13-14 representatively illustrate the exemplary embodiment of FIGS. 9-10 in an exploded view. Specifically, the handlebar portion 106, the stem portion 104 and an assembly of its internal operational mechanisms 108 along a longitudinal axis 102. It should be known by a person of ordinary skill in the art that the internal operational mechanisms 108 are not a unified structure with components necessarily attached to each other, but rather as shown in FIG. 13-14 in a manner depicting how discrete parts cooperate with each other when positioned within the handlebar portion 106 and the stem portion 104.

In this non-limiting embodiment, the handlebar portion 106 of the detachable handlebar unit 101 comprises a shoulder 142, at least one anti-rotation tab 140, a locking shaft 118, and a second key 122. The shoulder 142 and the anti-rotation tab 140 are configured such that they quickly engage with the locking groove 144 of the shaft collar 136 when the locking shaft 118 is inserted through the receiving shaft 126. To ease insertion of the locking shaft 118 into the hollow cylindrical receiver 110, the locking shaft in this non-limiting embodiment may have a tapered end except for a pronounced second key 122. The second key 122 is selectively positioned to slide through the shaft collar 136, a compression spring 152, the locking crown 125, and the key seat 150 of the tubular compression fitting 148. All of these components are shown in the manner in which they cooperate within the detachable handlebar unit 101. The locking shaft 118 may also be long enough for the key seat 122 to slide through the threaded insert 146 and the hollow cylindrical receiver.

Still referring to FIGS. 13-14, back plate screws 158 can hold the shaft collar 136, back plate 156, compression spring 152, and the locking crown 125 together. The back plate 156 shown in FIG. 13 has a series of back plate screw holes 157 which are formed to receive the back plate screws 158. In the embodiment disclosed, the back plate screws 158 may be fasteners, pins, rivets, bands, nails, straps, hinge-and-clip arrangements, and other methods and apparatuses to hold the back plate in place besides the screws may be used, including adhesives, welding, or unitary construction. In this view, a locking crown notch 160 is shown.

The shape of the stem portion 104, the handlebar portion 106, and the assembly of internal operational mechanisms 108 as depicted provide numerous advantages over prior art detachable handlebar systems. Often, the design of removable bicycle handlebar mechanisms involves coupling two hollow components together at a single point in order to create a quick coupling mechanism. This process leads to a weak connection between the components which is in turn felt by the end user. In contrast, each component of the detachable handlebar unit 101 cooperates with one another to create a coupling mechanism that is quick and easy to use, and retains the stability of conventional bicycles.

Figure 15:
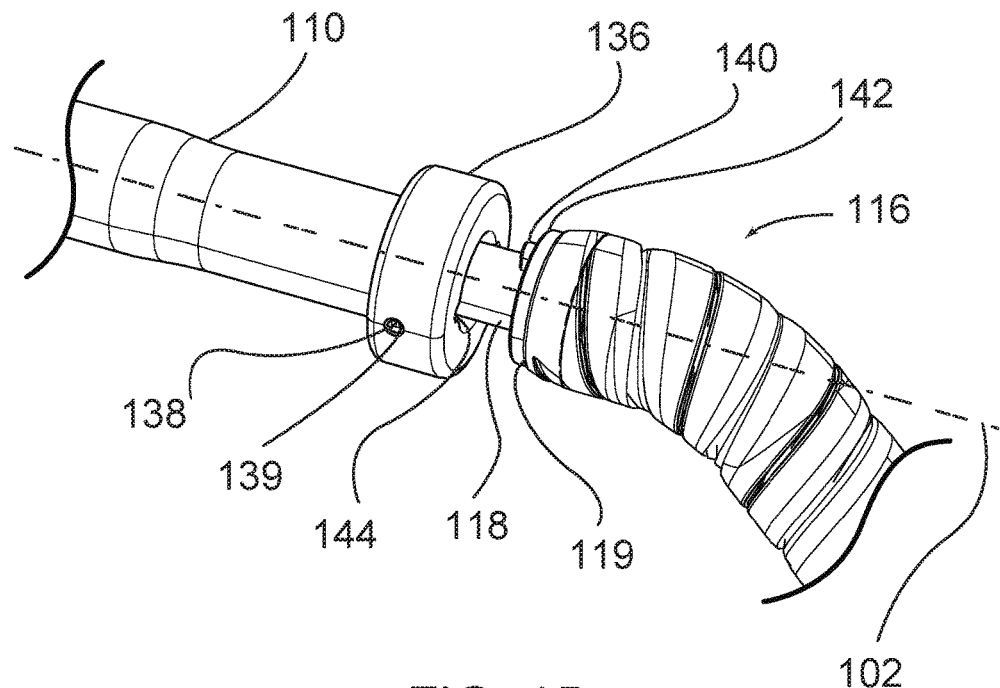
FIG. 15 depicts a side view of FIG. 12 as well as an implementation of shaft collar teeth.
Figure 16:
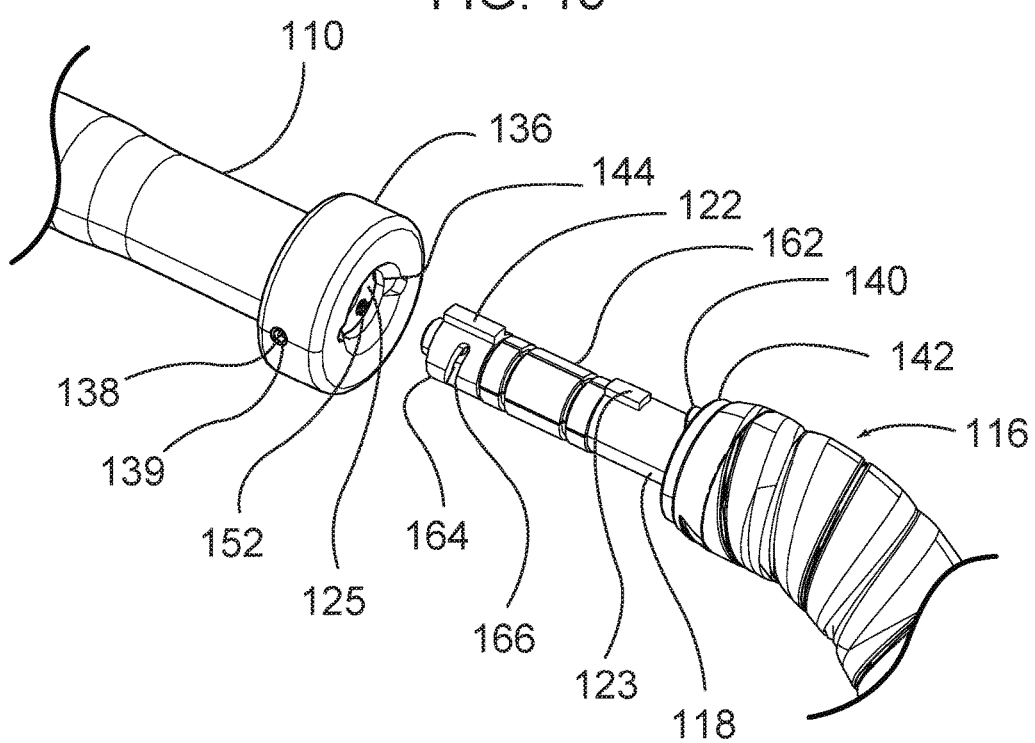
FIG. 16 depicts a cross section of an implementation of a detachable handlebar unit.

Turning now to FIGS. 15 and 16, FIG. 15 shows a side view of the detachable handlebar unit 101 and depicts the plane along which the cross-section is taken in the view of FIGS. 13-14. The views in FIGS. 15 and 16 both depict the handlebar portion 106 coupled to the stem portion 104. Specifically, FIG. 16 shows the locking shaft 118 disposed within the hollow cylindrical receiver 110 and the anti-rotation tabs 140 engaged with the locking grooves 144 (not shown in FIG. 16) of the shaft collar 136. This can be referred to as the "attached" position, because in this configuration, the handlebar portion 106 is locked in its position inside the stem portion 104 thus securing the handlebar 116 to the hollow cylindrical receiver 110. This attached position is known in the art to be the position in which conventional bicycle handlebars exist.

FIG. 15 shows the position of the assembly of internal operational mechanisms 108 in the attached position. The shaft collar 136 is disposed around the outside of the locking crown 125, locking teeth 154, receiving shaft 126, shaft collar teeth 141, and the locking shaft 118. The locking shaft 118 extends through the locking crown 125, locking teeth 154, and the receiving shaft 126 such that the locking shaft 118 is engaged via the key seat 150 of the tubular compression fitting 148. In this non-limiting embodiment, the shaft collar 136 is attached to the locking crown 125 by a series of shaft collar teeth 141 extending outward from the locking crown 125. In this non-limiting embodiment, the locking teeth 154 are a uniform size and symmetrical placement. However, it is contemplated that the locking teeth 154 may have differing sizes and placements on the locking crown 125. Additionally, the shaft collar 136 may be attached to the locking crown 125 by adhesives, mechanical integration, welding, molding, or any other way of bonding metals or polymers.

FIG. 16 shows the positions of the assembly of internal operational mechanisms 108 (as shown in FIG. 13) in the attached position. The shaft collar 136 is disposed around the handlebar portion 106 and the stem portion 104 of the detachable handlebar unit 101. The locking shaft 118 of the handlebar portion 106 has passed through the shaft collar 136, compression spring 152, back plate 156, locking crown 125, receiving shaft 126, tubular compression fitting 148, and in some embodiments, the threaded insert 146. The second key 122 of the locking shaft 118 (depicted as one solid unit in FIG. 16) has passed through the key seat 150 (depicted in FIG. 19) of the tubular compression fitting 148 until reaching the threaded insert 146. The threaded insert 146 is disposed within the hollow cylindrical receiver 110 and engaged with the hollow cylindrical receiver threading 147. However, the threaded insert may be configured to attach to the hollow cylindrical receiver threading 147 through adhesives, mechanical integration, welding, molding, or any other way of bonding metals or polymers. In this non-limiting embodiment, the compression spring 152 is disposed around the locking shaft 118 of the handlebar portion 106, and disposed within the shaft collar 136 of the stem portion 104.

In one non-limiting embodiment, the compression spring 152 is proximate the shaft collar 136 and the locking crown 125. The compression spring 152 may be attached to the shaft collar 136, the locking crown 125, or by adhesives, mechanical integration, welding, molding, or any other way of bonding metals or polymers. Alternatively, the compression spring 152 may simply be biased by the force created by the compression spring 152 against the locking crown 125, shaft collar 136, or both. In the embodiment depicted, the compression spring 152 comprises numerous interwoven metal bands which make up one singular unit. However, the compression spring 152 may also comprise a single coil unit of various, materials, diameters, and designs. As an alternative, the stem portion 104 may utilize a series of springs (see FIG. 21) with substantially equal force. When the handlebar portion 106 is pushed inward or pulled outward, the external force (e.g. force from fingers or hands pressing on the shaft collar 136) overcomes the force of the spring against which the external force is pressing. To illustrate, when the detachable handlebar unit 101 is not in the attached position the force from the compression spring 152 will cause it to expand to a neutral state pushing the shaft collar 136 away from the stem portion 104.

FIGS. 17-20 demonstrate an exemplary embodiment of the configuration of the locking shaft 118. In this non-limiting embodiment, the handlebar portion 106 has a shoulder 142 positioned proximate a locking shaft base 119 of the locking shaft 118 wherein at least one anti-rotation tab 140, and the locking shaft 118 extends outward from the shoulder 142 along the longitudinal axis 102. Additionally, this configuration of the locking shaft 118 comprises a first key 123, a second key 122, a tubular gasket 162, a bushing 164, a peg 172, and a guiding slot 166.

Figure 17:
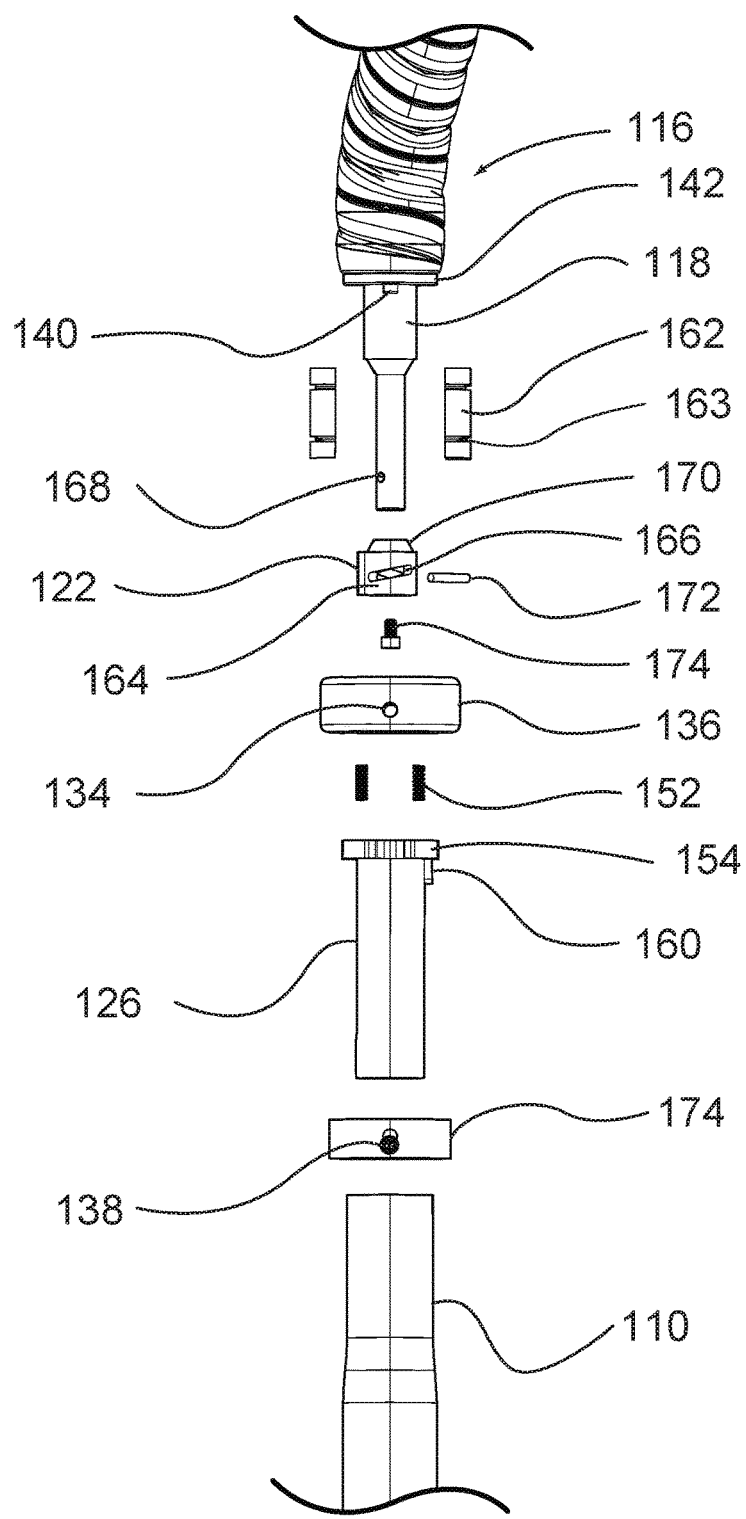
FIG. 17 depicts an implementation of a detachable handlebar unit
Figure 18:
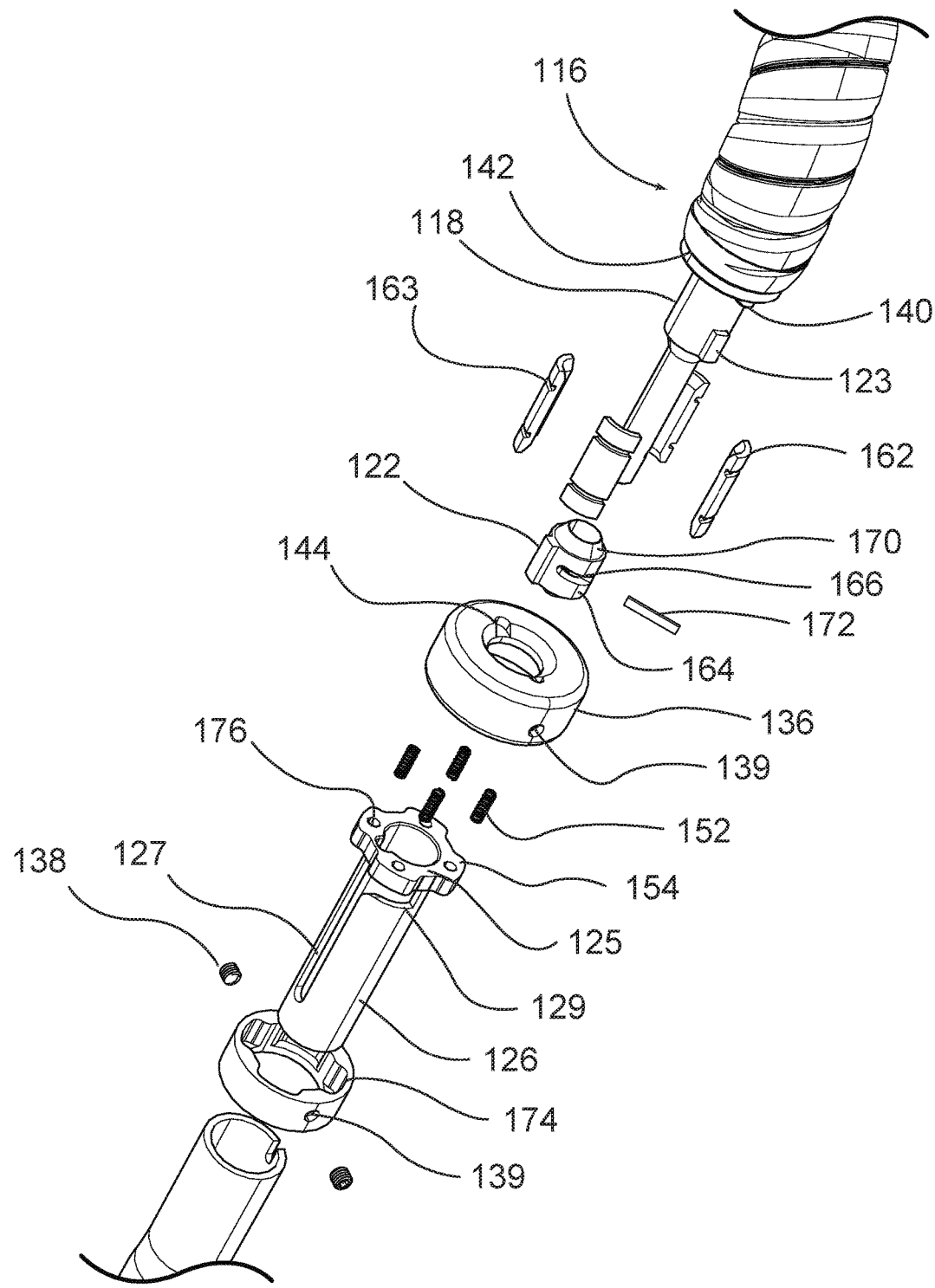
FIG. 18 depicts a front view of FIG. 17

Referring to FIGS. 17-18, the bicycle handlebar unit 101 is shown from an angled perspective and a front facing view. The handlebar portion 106 and the stem portion 104 are in the attached position. In this position, the assembly of internal operational mechanisms 108 are not shown.

Figure 19:
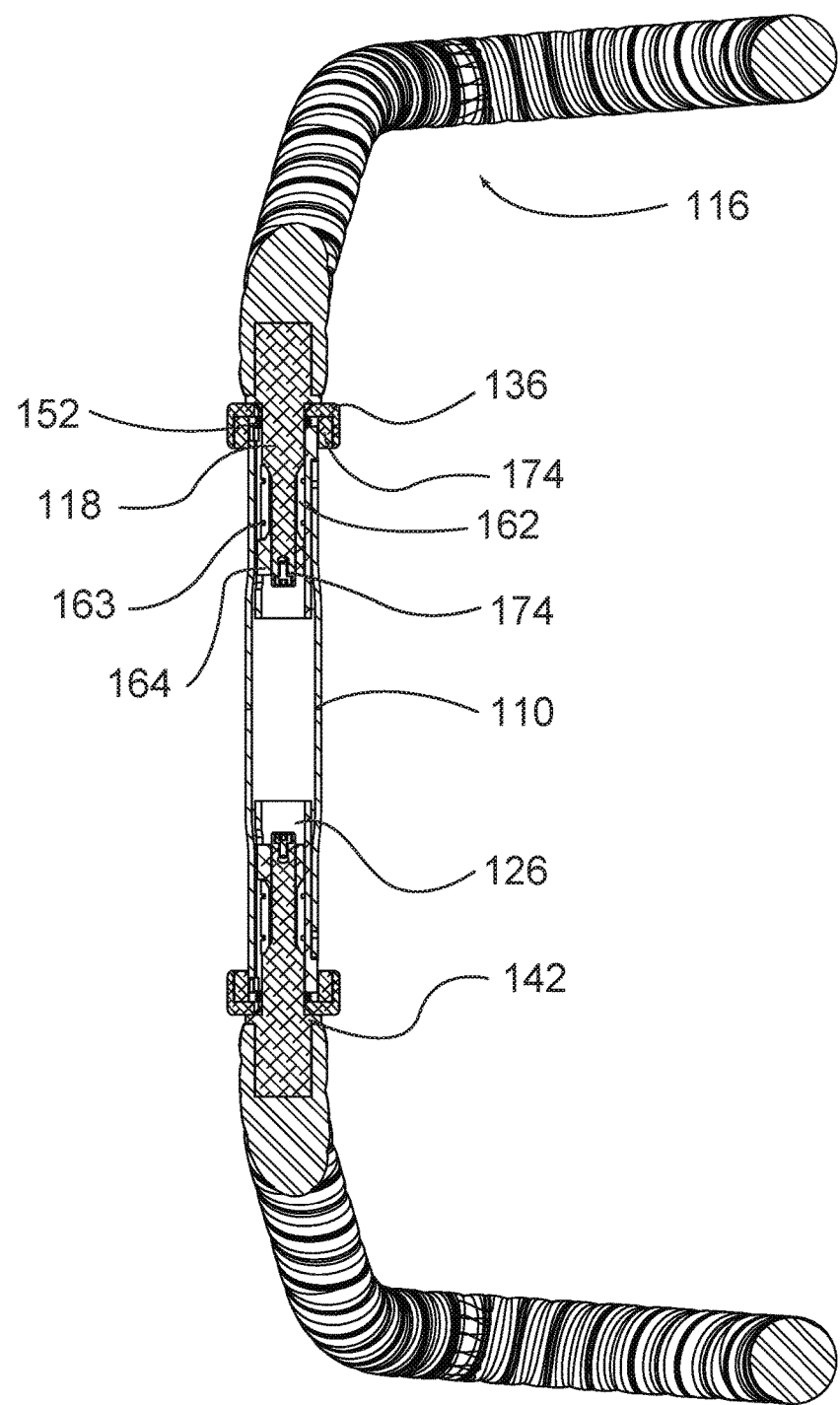
FIG. 19 depicts an implementation of the handlebar portion and the stem portion.
Figure 20:
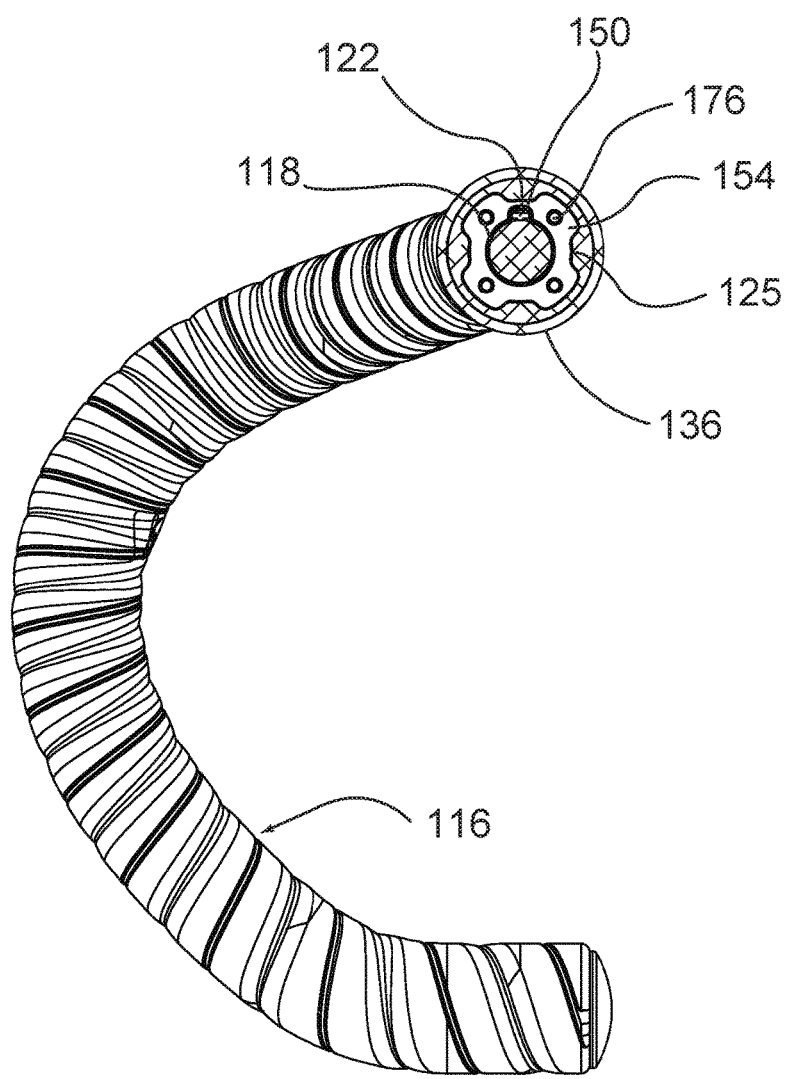
FIG. 20 depicts an implementation of the locking shaft, the rest of the handlebar portion, and the stem portion.

Turning to FIGS. 19-20, the stem portion 104 and the handlebar portion 106 are shown in the unattached position. The shaft collar 136 and back plate 156 are disposed around the hollow cylindrical receiver 110. In both figures the locking grooves 144 can be seen on the face of the shaft collar 136 facing the handlebar portion 106. The handlebar portion 106 comprises the handlebars 116, shoulder 142, anti-rotation tabs 140 and locking shaft 118. As mentioned earlier FIGS. 19-20 show a further exemplary embodiment of the locking shaft 118. In this embodiment, the second key 122 of the locking shaft 118 may be lined up with the key seat 150 (depicted in FIG. 20) of the shaft collar 136 along the longitudinal axis 102. Orienting the second key 122 with the key seat 150 allows the locking shaft 118 to be pushed through the shaft collar 136 and on through the receiving shaft 126. A portion of the first receiving slot 127 is depicted in FIG. 20 disposed within the shaft collar 136, ready to receive the second key 122 of the locking shaft 118.

Figure 21:
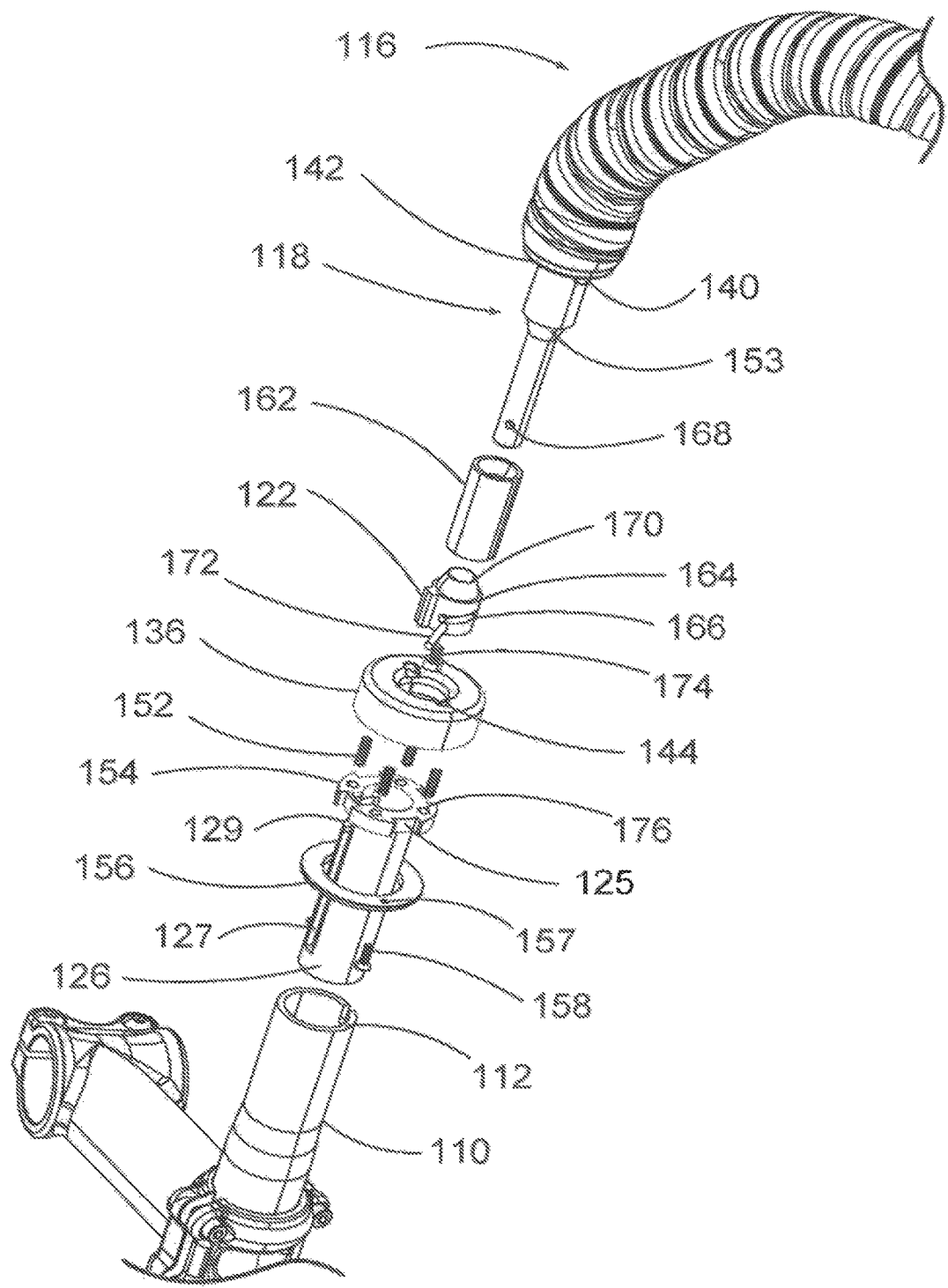
FIG. 21 depicts an exploded view of an implementation of a locking shaft and stem portion.
Figure 22:
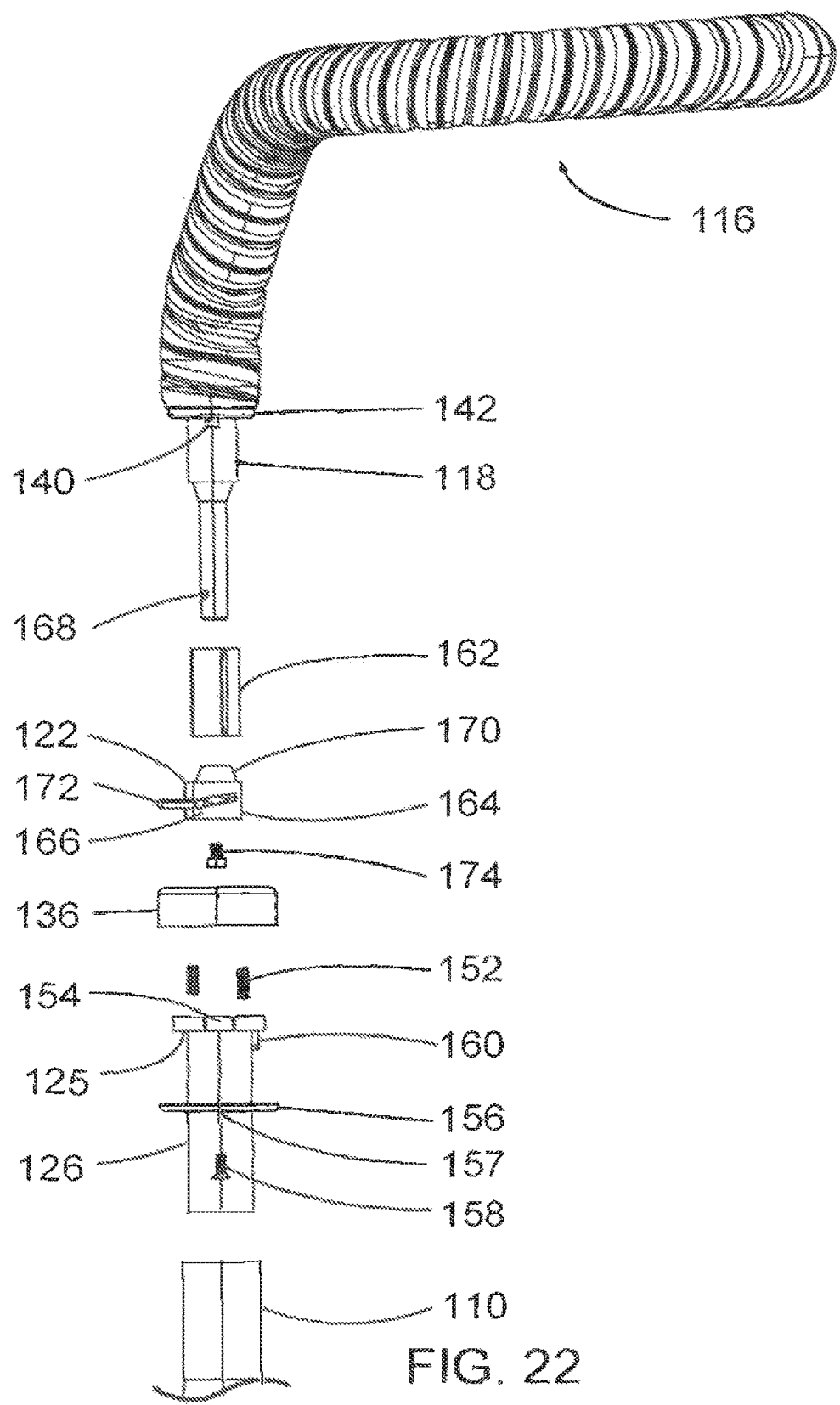
FIG. 22 depicts a top view of FIG. 21

FIGS. 21-22 illustrate how the above is accomplished. Specifically, the receiving shaft 126 has a first receiving slot 127 and a second receiving slot 129. The first receiving slot 127 extends along at least a portion of the receiving shaft 126 and is disposed in coaxial alignment with the receiving shaft 126. The second receiving slot 129 extends along a portion of the circumference of the receiving shaft 126. The first receiving slot 127 is configured to engage with the first receiving slot 127 as the locking shaft slides through the receiving shaft 126. In this non-limiting embodiment, the second key 122 is disposed on top of a bushing 164, extending perpendicular from the longitudinal axis 102. The bushing 164 comprises a bushing insert 170, such that the diameter of the bushing insert 170 will allow the bushing insert 170 to slidably couple with a compressible gasket 162. In another embodiment, the bushing 164 is directly coupled with the compressible gasket 162. The bushing 164 further comprises a peg 172 and a guiding slot 166 configured to receive the peg 172. The peg 172 may be attached to the locking shaft 118, bushing 164, and guiding slot 166 by adhesives, molding, welding, unitary construction or it may rest within the peg cavity 168. To illustrate, in the instant embodiment the locking shaft 118 comprises a peg cavity 168 proximate the guiding slot 166 of the bushing 164 that is configured to receive the peg 172 such that the peg 172 is disposed within the bushing 164 and extends outward perpendicular to the longitudinal axis 102. It should be contemplated that other variations of the peg 172 can include different sizes, geometric shapes, and numbers of pegs 172. To illustrate, the peg 172 may have a square or hexagonal profile or a larger or smaller diameter than shown addition, the locking shaft 118 may not need to comprise a peg cavity 168, instead it could have pegs 172 that are attached through bonding, adhesive, mechanical integration, welding, molding, or any other way of melding metals and polymers.

Figure 30:
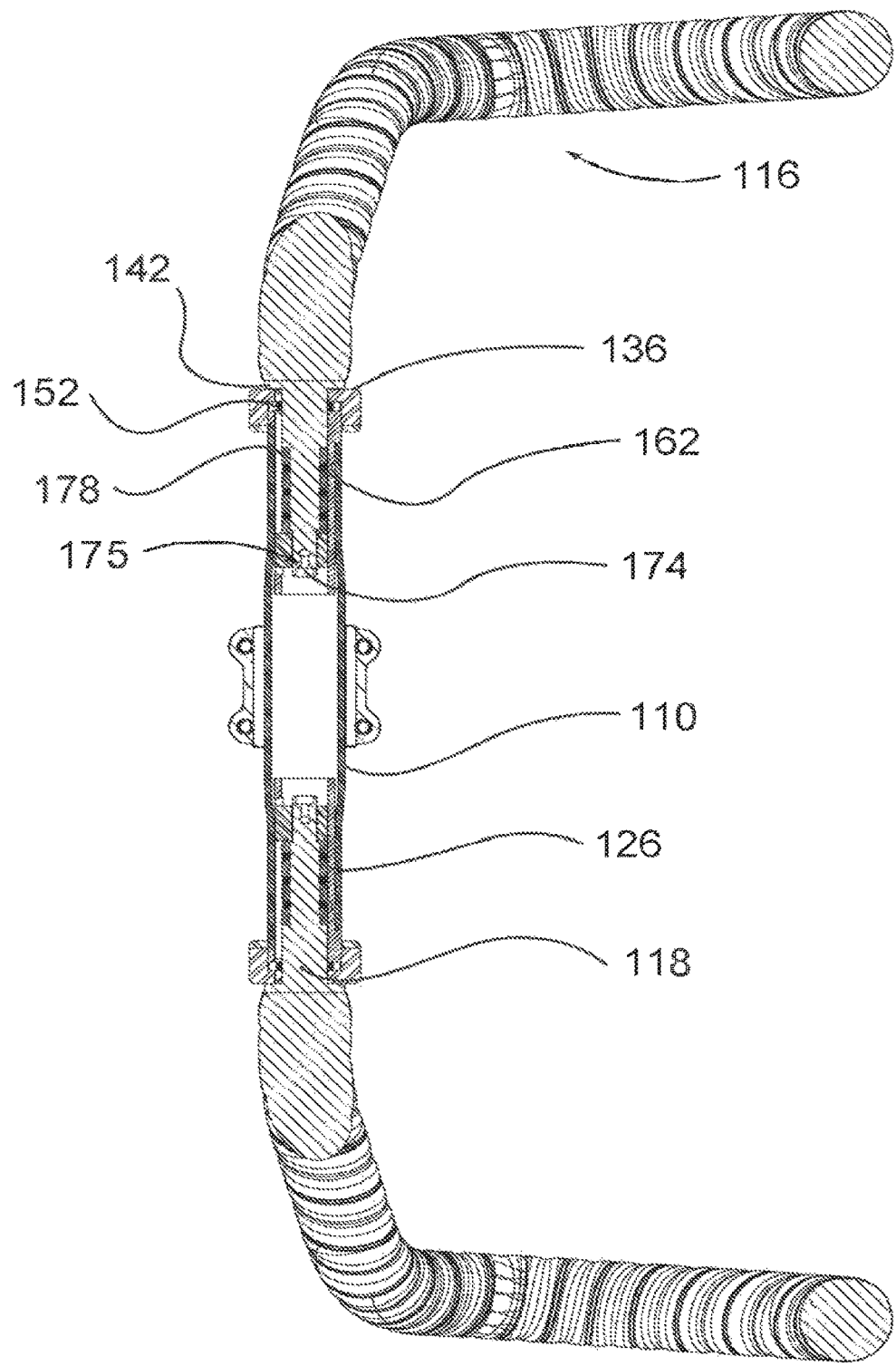
FIG. 30 depicts a cross section of a detachable handlebar unit with the locking shaft embodiment of FIG. 26.
Figure 31:
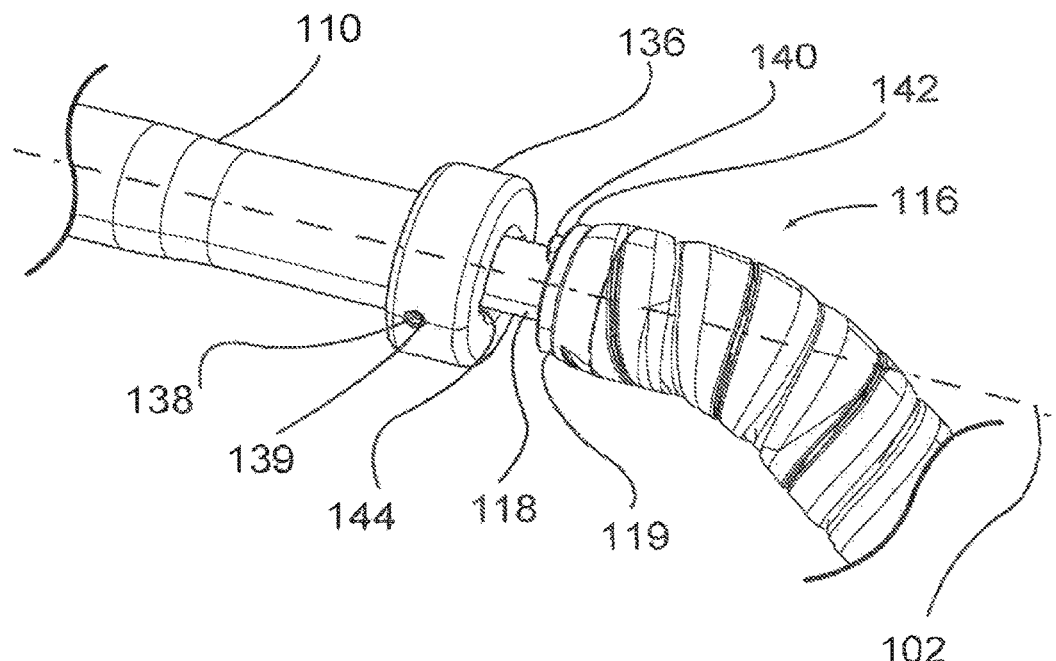
FIG. 31 depicts a close-up view of an implementation of a handlebar portion and a stem portion.

In this non-limiting embodiment, the compressible gasket 162 is located between the bushing 164 and the locking shaft 118, specifically between the bushing insert 170 and a tapered mating surface 153 wherein the bushing insert 170 and the tapered mating surface 153 are configured to receive the compressible gasket 162. As the bushing insert 170 and the tapered mating surface 153 are pushed together an inner portion of the compressible gasket 162. expands and pushes into the receiving shaft 126, thereby providing sealing and stability thereof for the handlebar portion 106 when it is in the attached position. In this non-limiting embodiment, the compressible gasket 162 is an elongated ring of compressible polymer material sized so as to fit over the locking shaft 118. It should be contemplated by a person of ordinary skill in the art that the length of the compressible gasket 162 can vary such that it conforms with the size of the locking shaft 118 or the assembly of internal operational mechanisms 108. Additionally, it may be desirable for the compressible gasket 162 to be made from metal, metal alloys, or both, The metal components may be manufactured using conventional or unconventional techniques such as machining, molding, casting, or laser fusing. The polymer components can be manufactured using various techniques as well. The locking shaft 118 includes a locking shaft screw 174 proximate the bushing 164 and extending through at least a portion of a locking shaft screw hole 175 (depicted in FIG. 30) wherein the locking shaft screw hole 175 extends coaxially through the locking shaft 118 for at least a portion of its length. The locking shaft screw 174 is configured to engage the bushing 164 such that the assembly of internal operational mechanisms 108 of the handlebar portion 106 maintain their position on the locking shaft 118.

Referring specifically to the stem portion 104 in FIGS. 21-22, the hollow cylindrical receiver 110 is shown disposed around the receiving shaft 126 and proximate the shaft collar 136. In between the shaft collar 136 and the hollow cylindrical receiver 110 is the locking crown 125. The locking crown 125 has a receiving shaft 126 extending outward in coaxial alignment with the longitudinal axis 102. In this non-limiting embodiment, the receiving shaft comprises a first receiving slot 127 and a second receiving slot 129 (depicted in FIG. 21), the first receiving slot 127 is configured to receive the second key 122 of the locking shaft 118 and the second receiving slot 129 is configured to receiving the first key 123 of the locking shall 118. In this embodiment, the first receiving slot 127 and second receiving slot 129 are shown with angled edges to match the angled edges of the first key 123 and second key 122. However, it should be contemplated by a person with ordinary skill in the art that the edges of the receiving slots may be curved or comprise extended lips or a detent to engage either the first key 123 or the second key 122. The locking crown 125 also has locking teeth 154 extending outward substantially perpendicular to the longitudinal axis 102. The locking teeth mechanically engage with a shaft collar teeth 141 to prevent rotation except for radially movement along the longitudinal axis 102. In the present embodiment (see FIG. 21), the reference is shown having four locking teeth 154. It should be contemplated by a person of ordinary skill in the art that the number of locking teeth can be different to accommodate the purpose of the invention without departing form the scope of the disclosure. For example, in one embodiment the locking crown 125 could have eight locking teeth 154 of substantially smaller size than what is shown in FIG. 21. However, the locking teeth 154 still need to account for the compression spring openings 176, such that the locking teeth 154 are of a large enough size that a compression spring opening 176 can be present to receive a compression spring 152.

FIG. 22 shows a top view of the stem portion 104 and the handlebar portion 106. In this view, the locking crown notch 160 is shown between the locking crown 125 and the back plate 156. The locking crown notch 160 exists so that the receiving shaft 126 may be attached to the hollow cylindrical receiver 110 without physically interfering with the assembly of internal operational mechanisms 108. Specifically, the manufacturer can insert a screw, or any other method of attaching components, from the outside of the hollow cylindrical receiver 110 into the locking crown notch 160 to prevent the receiving shaft 126 from moving or rotating within the hollow cylindrical receiver 110.

Figure 23:
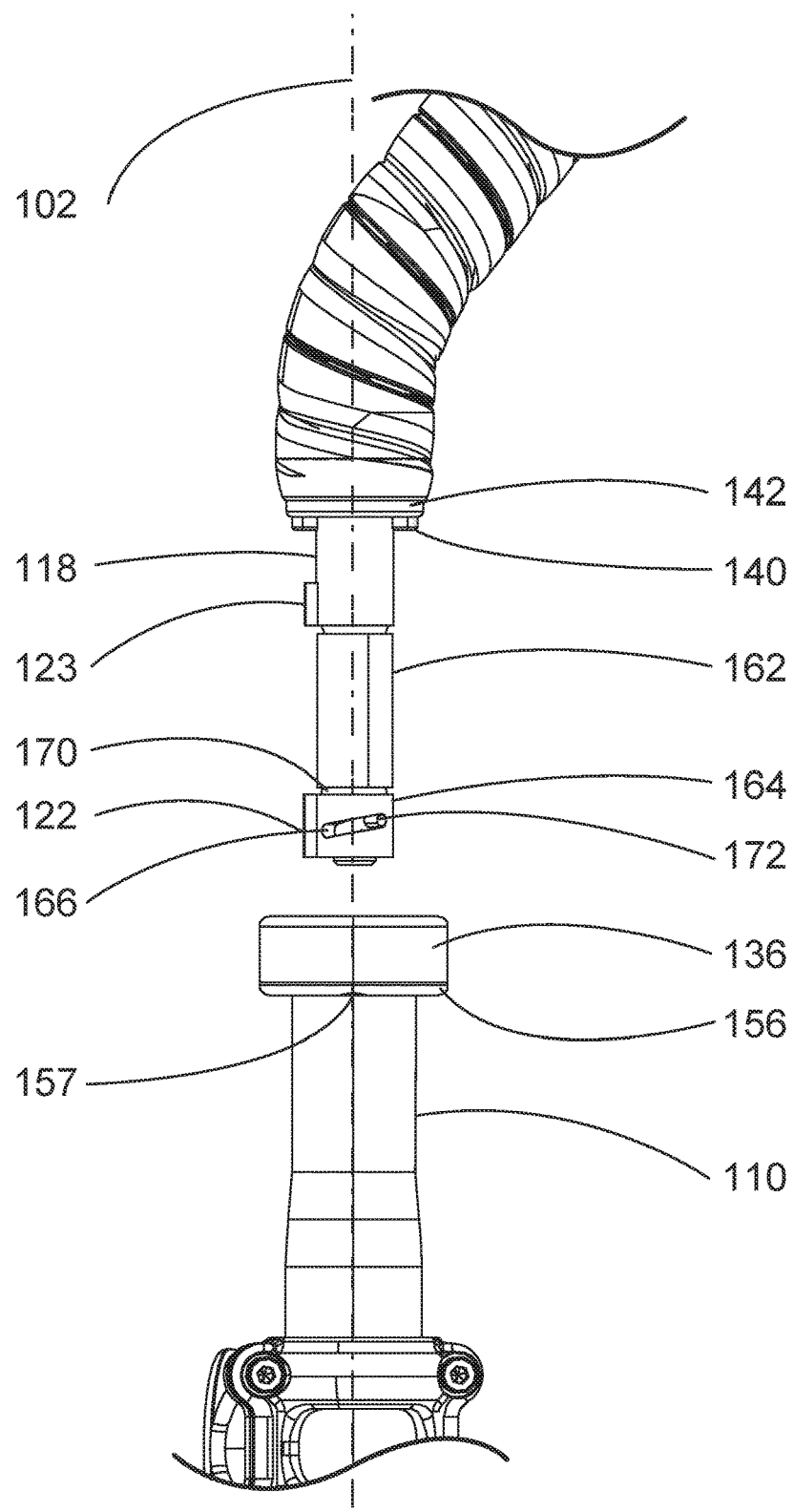
FIG. 23 depicts an implementation of a handlebar portion and a stem portion with a non-limiting embodiment of the locking shaft.

FIG. 23 shows the stem portion 104 and the handlebar portion 106 such that the handlebar portion 106 is ready to be inserted into the stem portion 104. When the handlebar portion 106 is assembled together, the peg 172 is disposed within the guiding slot 166 such that when the locking shaft 118 is being moved into the attached position the locking shaft 118 rotates along a circumference of the longitudinal axis 102 pushing the peg 172 through the guiding slot 166 which in turn causes the bushing 164 to press against the compressible gasket 162 in a controlled manner.

Figure 24:
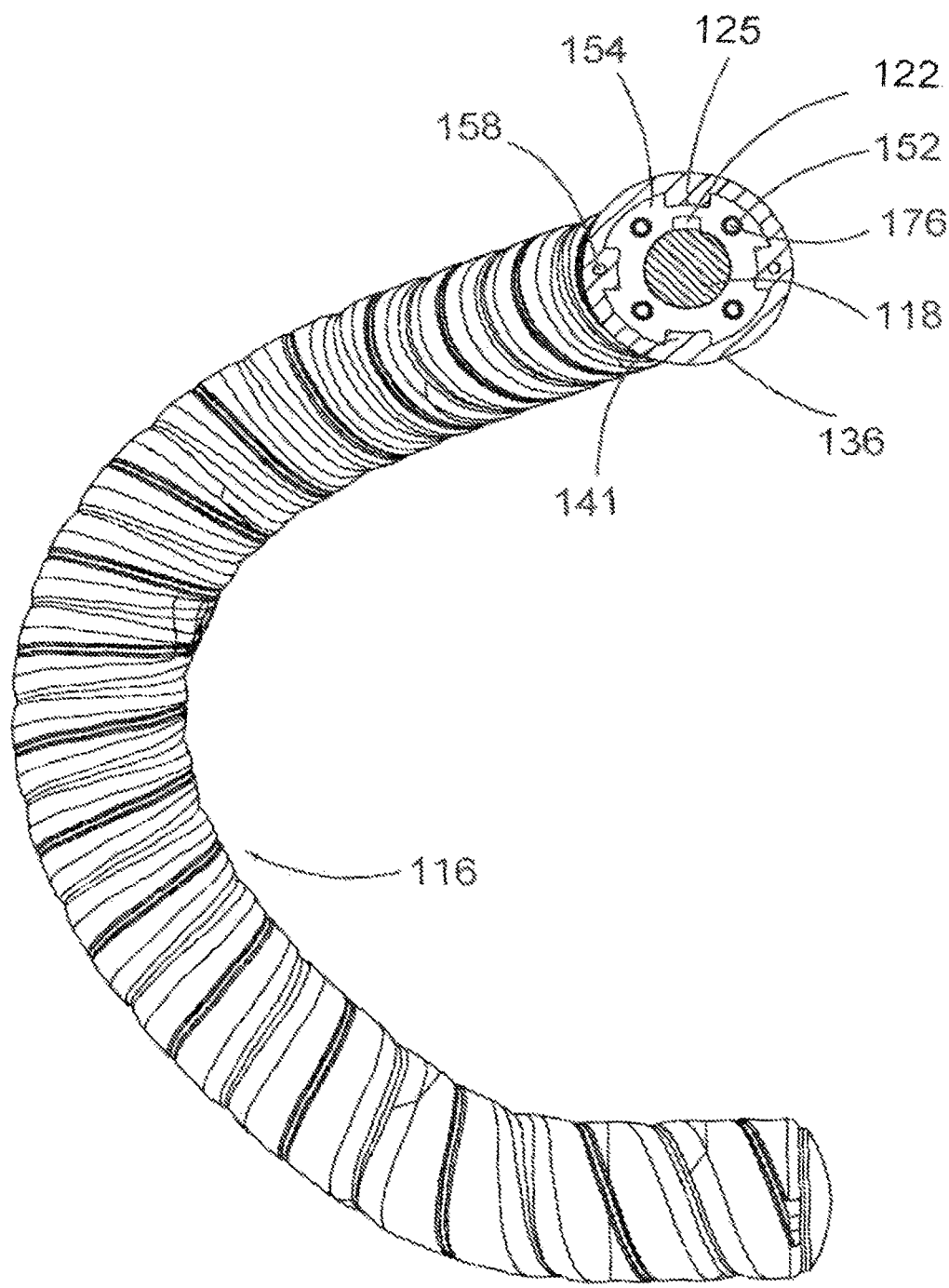
FIG. 24 depicts a side view of FIG. 19
Figure 25:
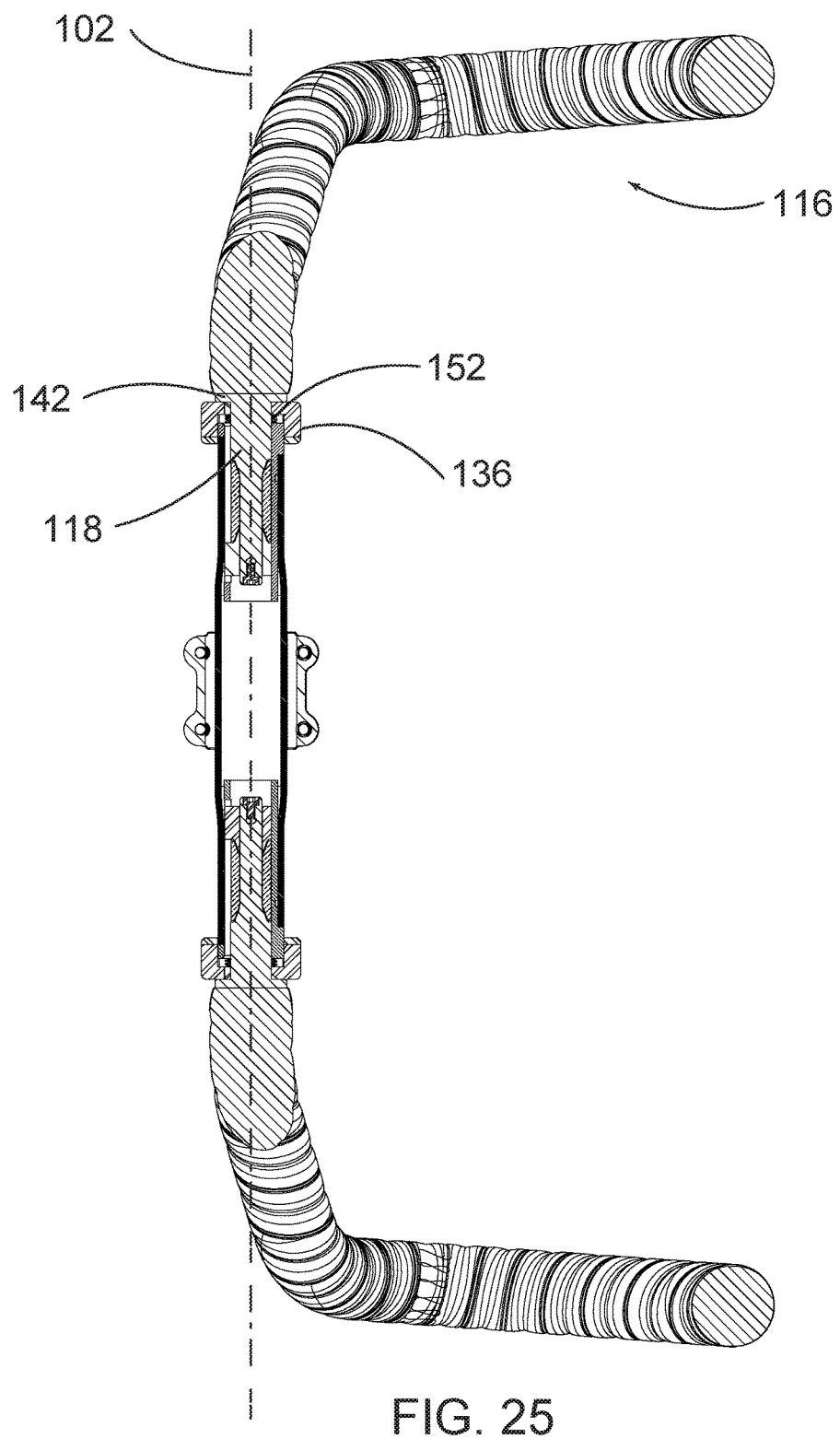
FIG. 25 depicts a cross section of an implementation of the detachable handlebar unit of FIG. 19.

Turning now to FIGS. 24 and 25, FIG. 24 shows a side view of the handlebar portion 106 and the stem portion 104 in the attached position. FIG. 24 shows the portion of the detachable handlebar unit 101 cut through the shaft collar 136. Specifically, the shaft collar teeth 141 engaged with the locking teeth 154 such that the movement of the detachable handlebar unit 101 is bound to radially movement along the longitudinal axis 102. FIG. 25 depicts another cross section view of the locking shaft embodiment from FIG. 20.

Figure 26:
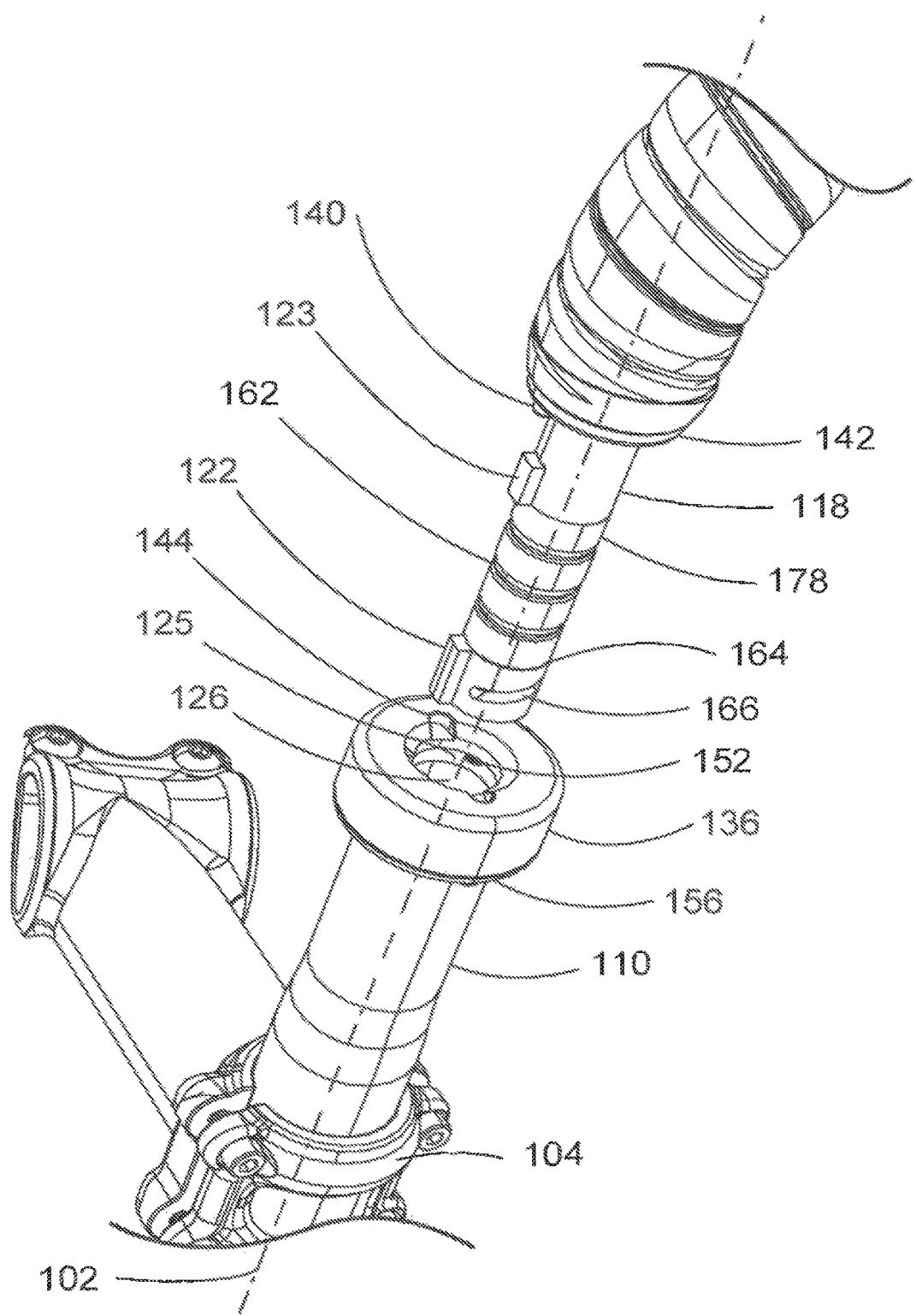
FIG. 26 depicts an angled view of the handlebar portion and the stem portion with a non-limiting embodiment of the locking shaft.
Figure 27:
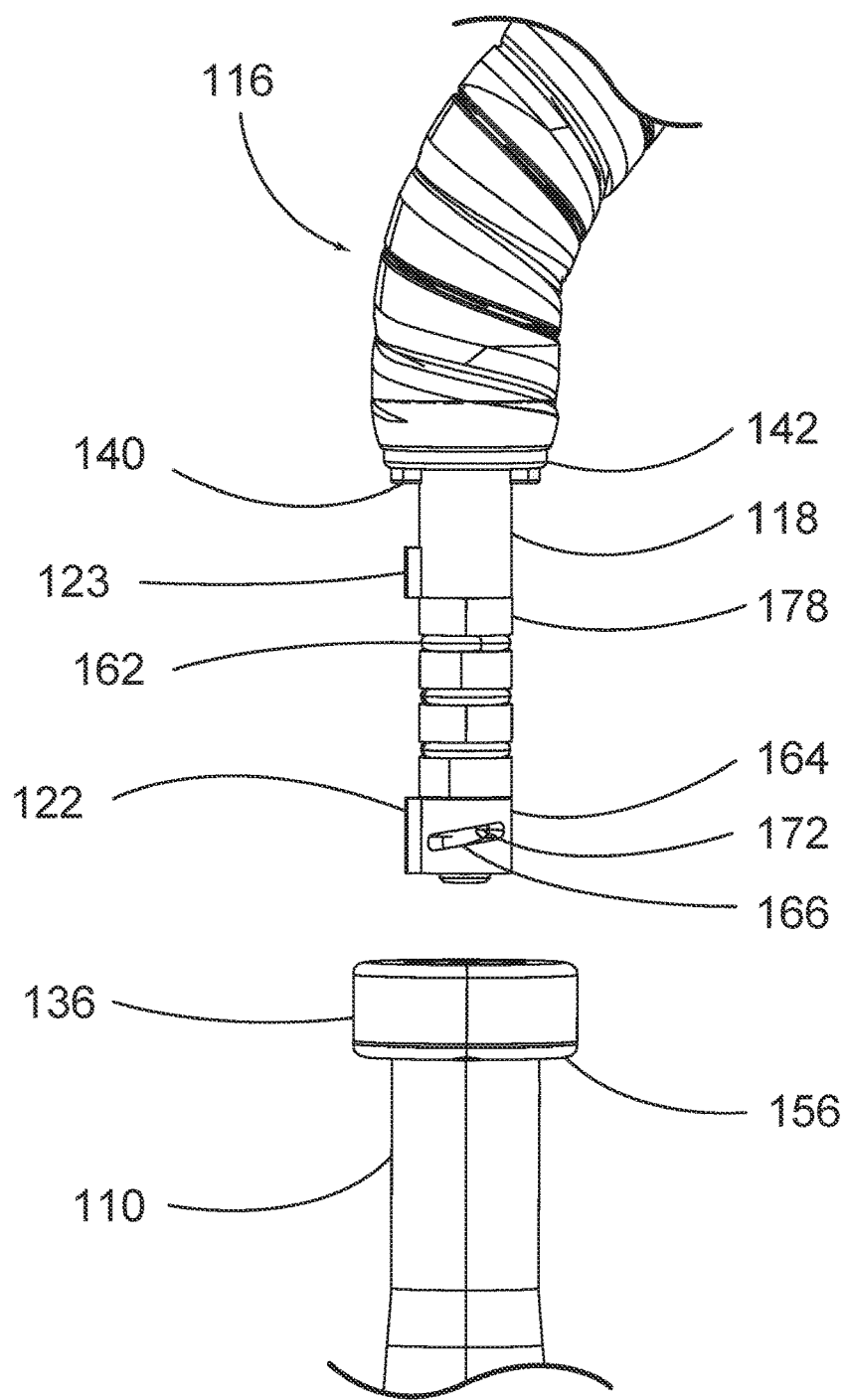
FIG. 27 depicts a top view of FIG. 26
Figure 28:
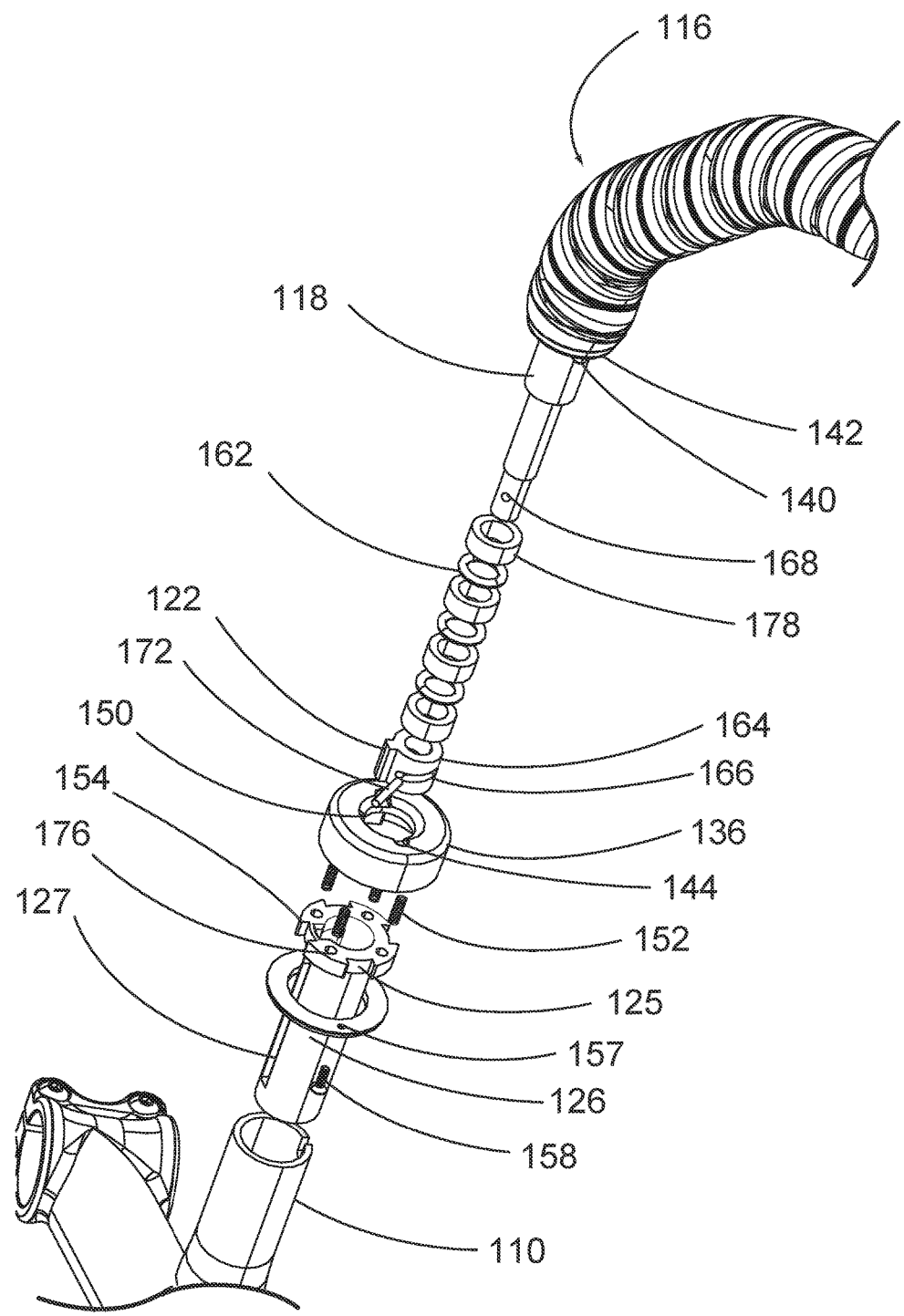
FIG. 28 depicts an exploded view of an implementation of a non-limiting embodiment of a locking shaft.
Figure 29:
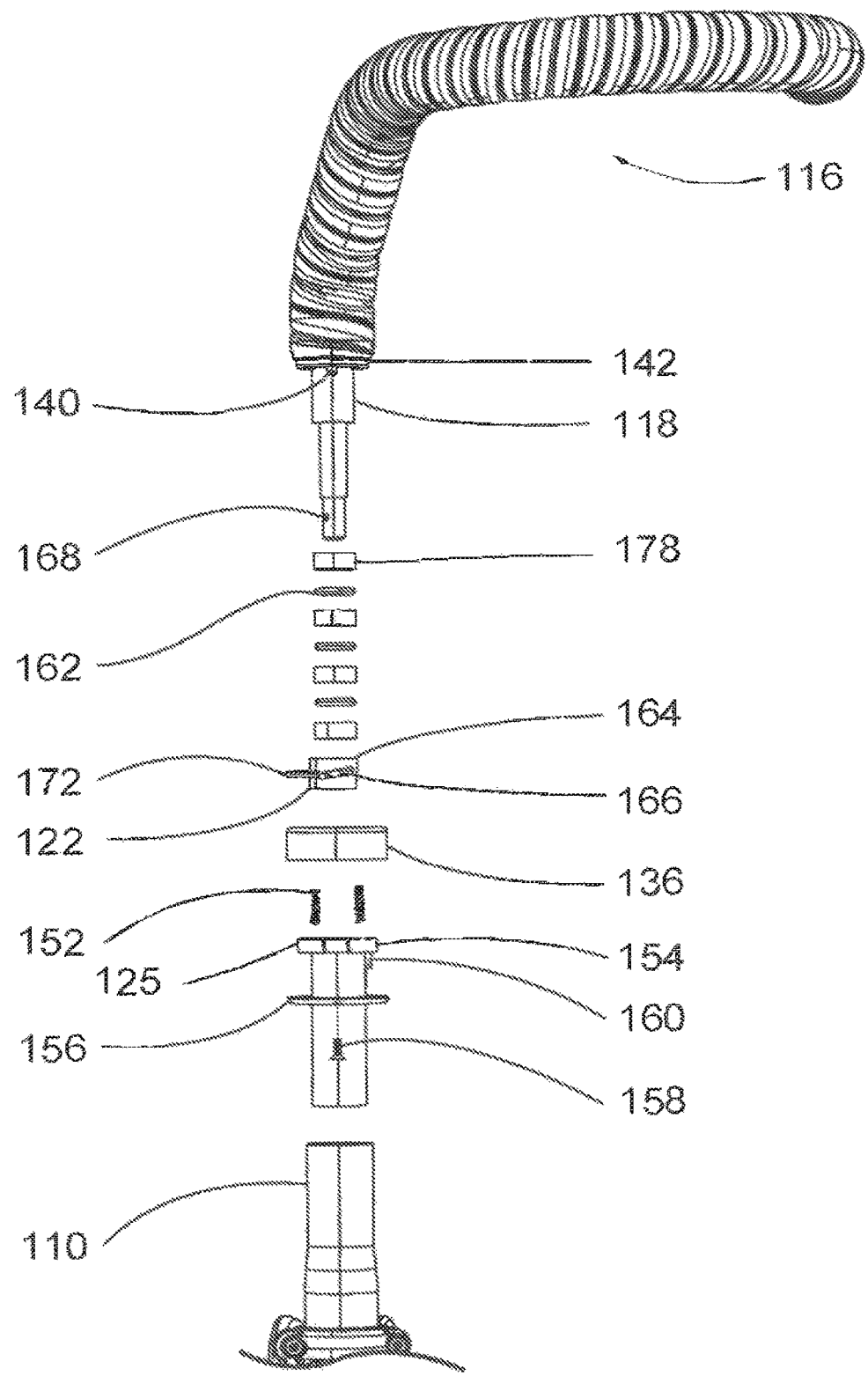
FIG. 29 depicts a top view of FIG. 28.

FIGS. 26-30 demonstrate an exemplary embodiment of the configuration of the locking shaft 118. In this non-limiting embodiment, the handlebar portion 106 has a shoulder 142 positioned proximate a locking shaft base 119 of the locking shaft 118 wherein at least one anti-rotation tab 140, and the locking shaft 118 extends outward from the shoulder 142 along the longitudinal axis 102. Additionally, this configuration of the locking shaft 118 comprises a first key 123, a second key 122, a tubular gasket 162, a bushing 164, a peg 172 (depicted in FIGS. 27-29), and a guiding slot 166. FIG. 26 shows the handlebar portion in its fully assembly position. In this non-limiting embodiment, the locking shaft 118 extends through a series of alternation compressible gaskets 162 and washers 178. For purposes of clarity, the compressible gaskets 162 and washers 178 are positioned between the bushing 164 and the first key 123. The compressible gaskets 162 in this embodiment perform substantially the same function as the gaskets in the other embodiments of the instant invention but are generally depicted as smaller than the others.

In the embodiment shown, the shape of the washer 178 is cylindrical so that it is configured to be disposed around the locking shaft 118. Other variations of the washers 178 (depicted in FIGS. 28-29) can include differing sizes, shapes, and numbers of washers 178 without departing from the scope of this disclosure. The washers 178 can be substantially rigid to resist expansion when the handlebar portion 106 is being coupled to the stem portion 104.

Figure 32:
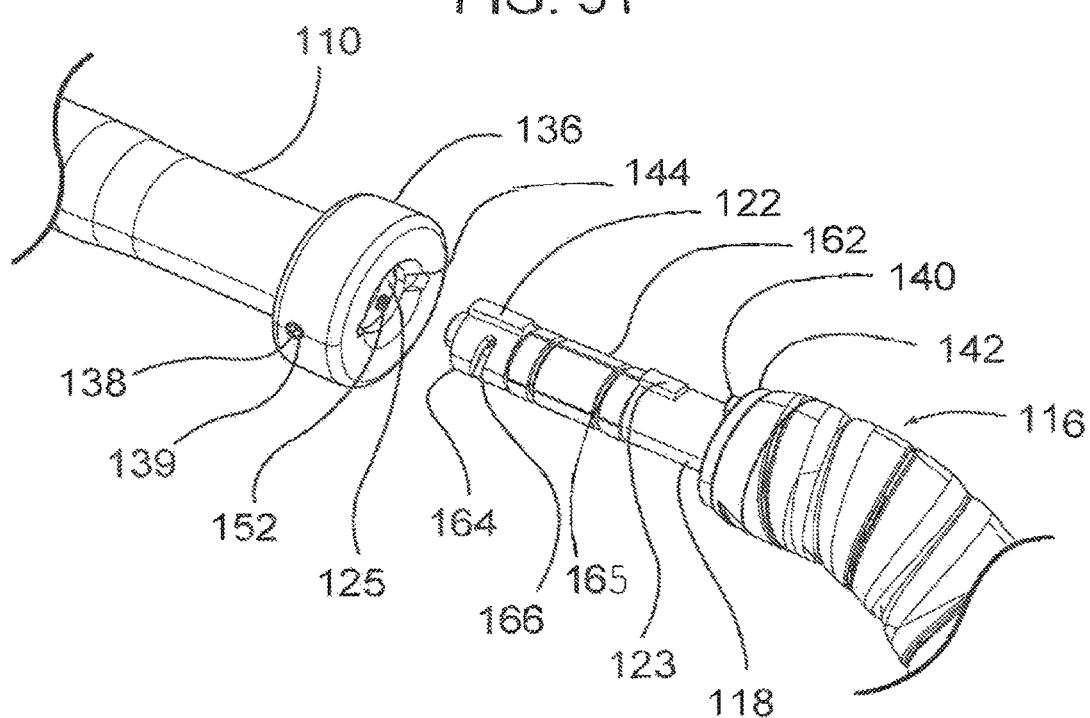
FIG. 32 depicts an angled view of an implementation of the handlebar portion and the stem portion with a non-limiting embodiment of the locking shaft.

FIGS. 31-36 demonstrate an exemplary embodiment of the configuration of the locking shaft 118. In this non-limiting embodiment, the handlebar portion 106 has a shoulder 142 positioned proximate a locking shaft base 119 of the locking shaft 118 wherein at least one anti-rotation tab 140, and the locking shaft 118 extends outward from the shoulder 142 along the longitudinal axis 102. Additionally, this configuration of the locking shaft 118 comprises a first key 123, a second key 122, a compressible gasket 162, a bushing 164, a peg 172, and a guiding slot 166. FIG. 32

Figure 33:
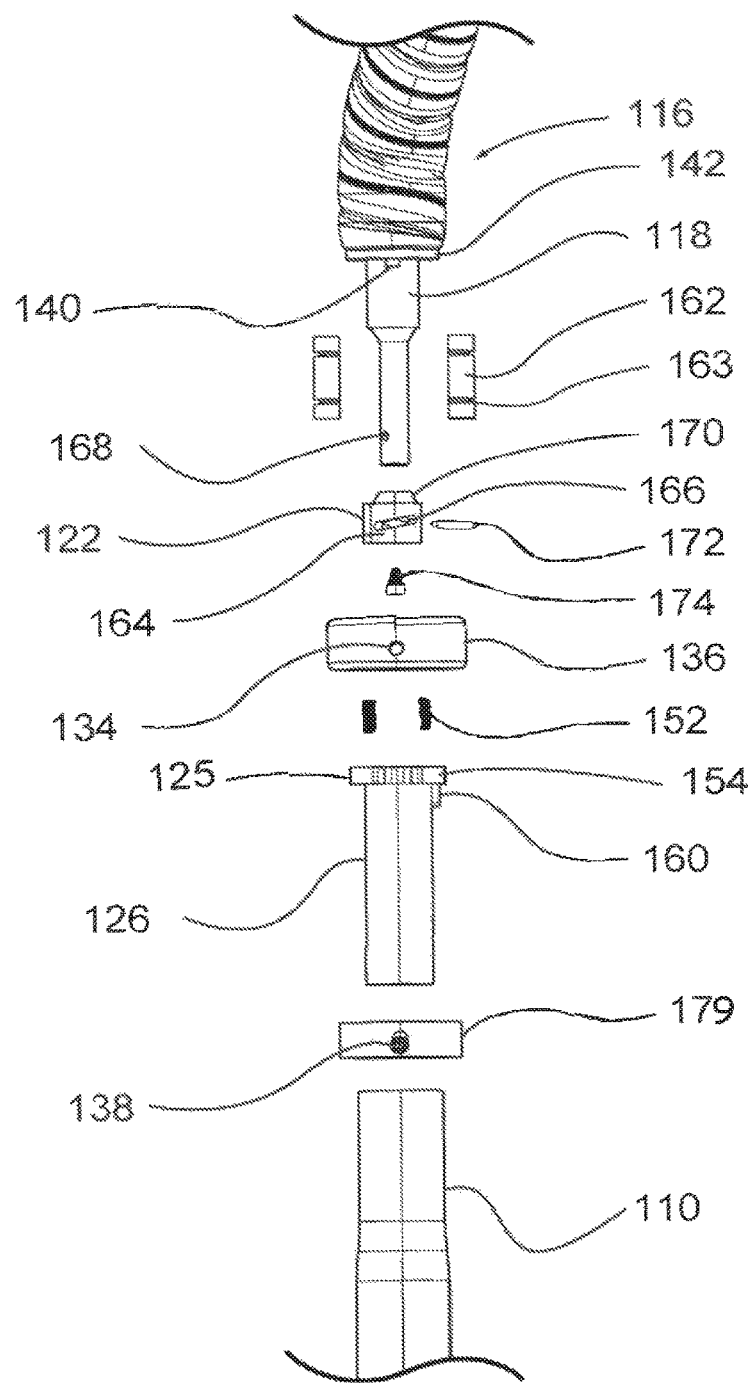
FIG. 33 depicts an exploded view of an implementation of the non-limiting embodiment of the locking shaft in FIG. 32
Figure 34:
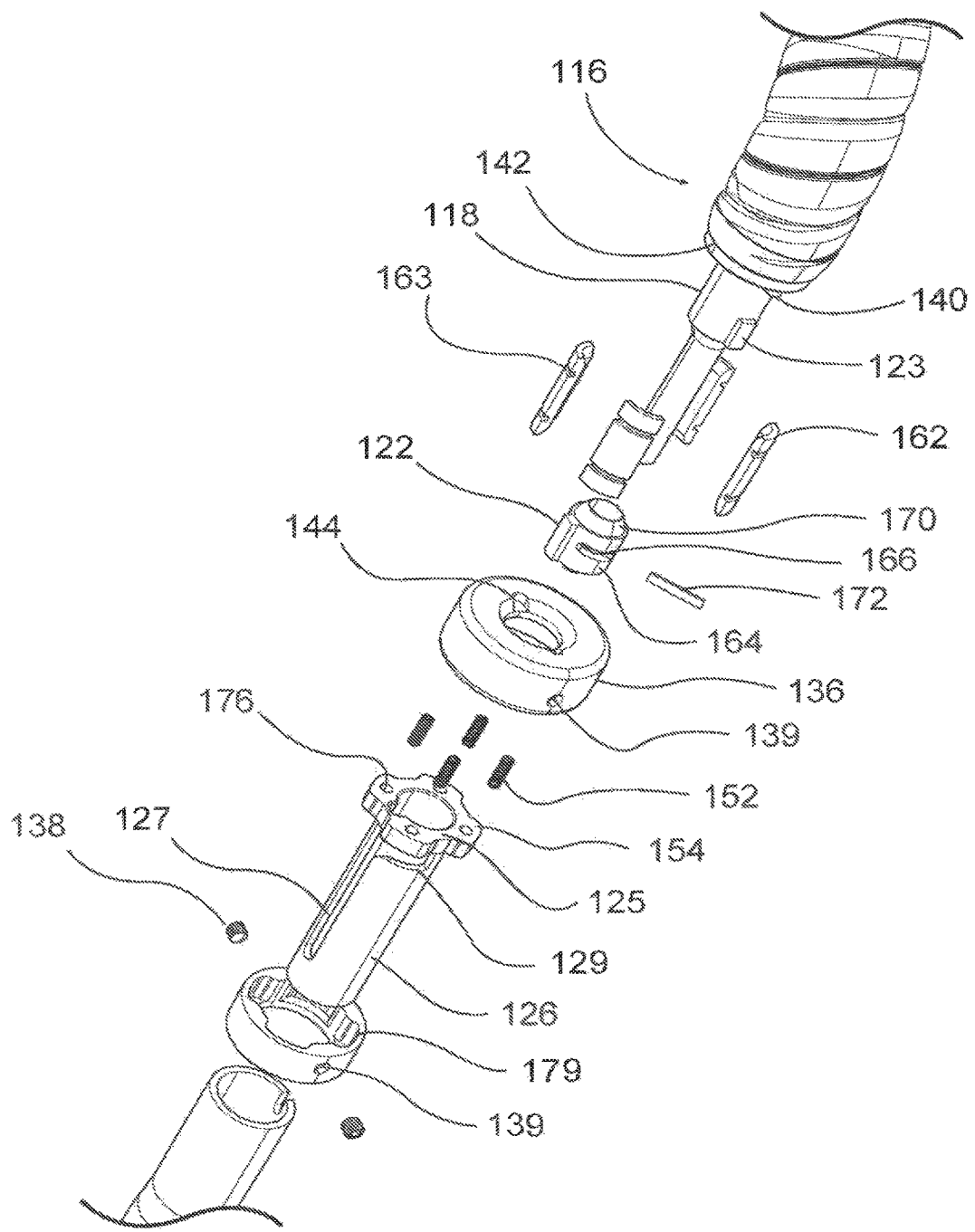
FIG. 34 depicts an angled exploded view of FIG. 33
Figure 35:
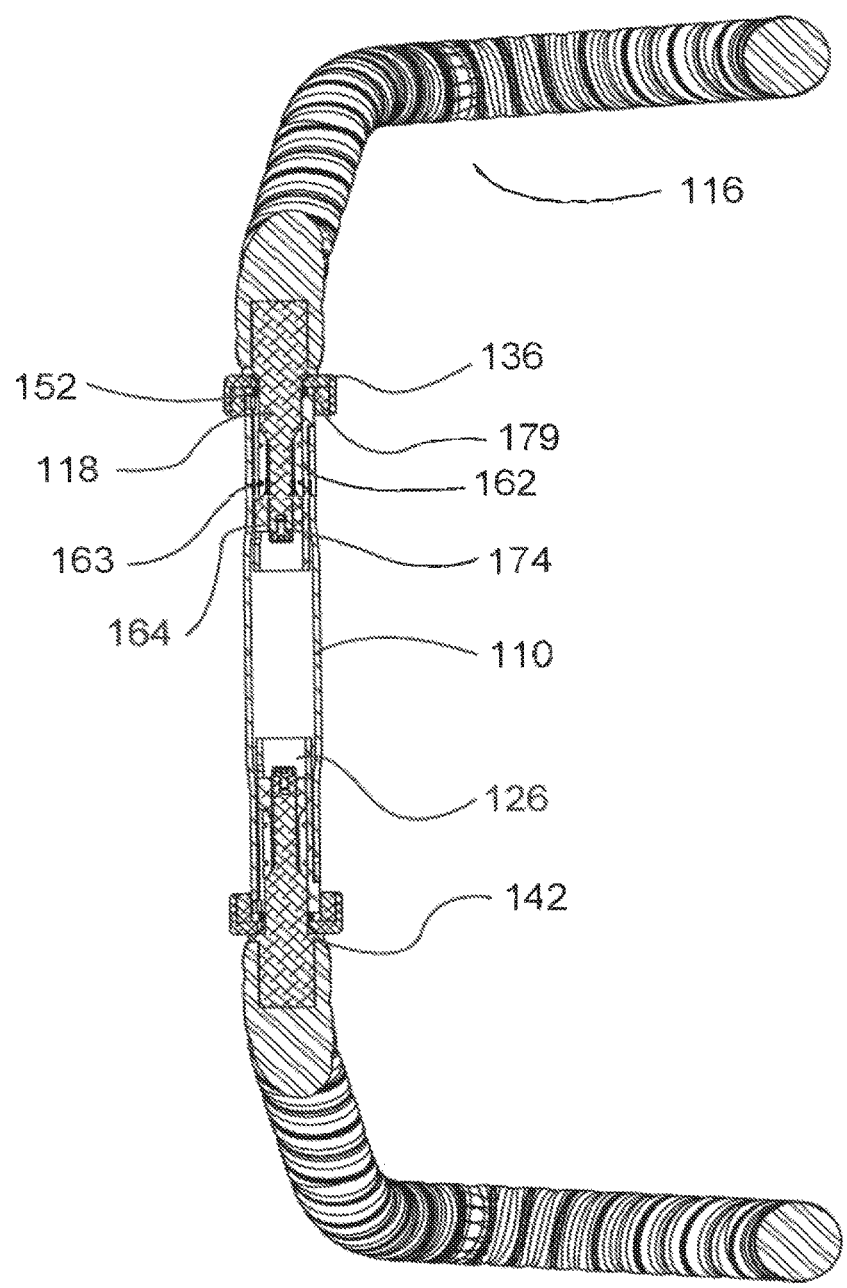
FIG. 35 depicts a cross section of an implementation of detachable handlebar unit with the locking shaft embodiment of FIG. 32.
Figure 36:
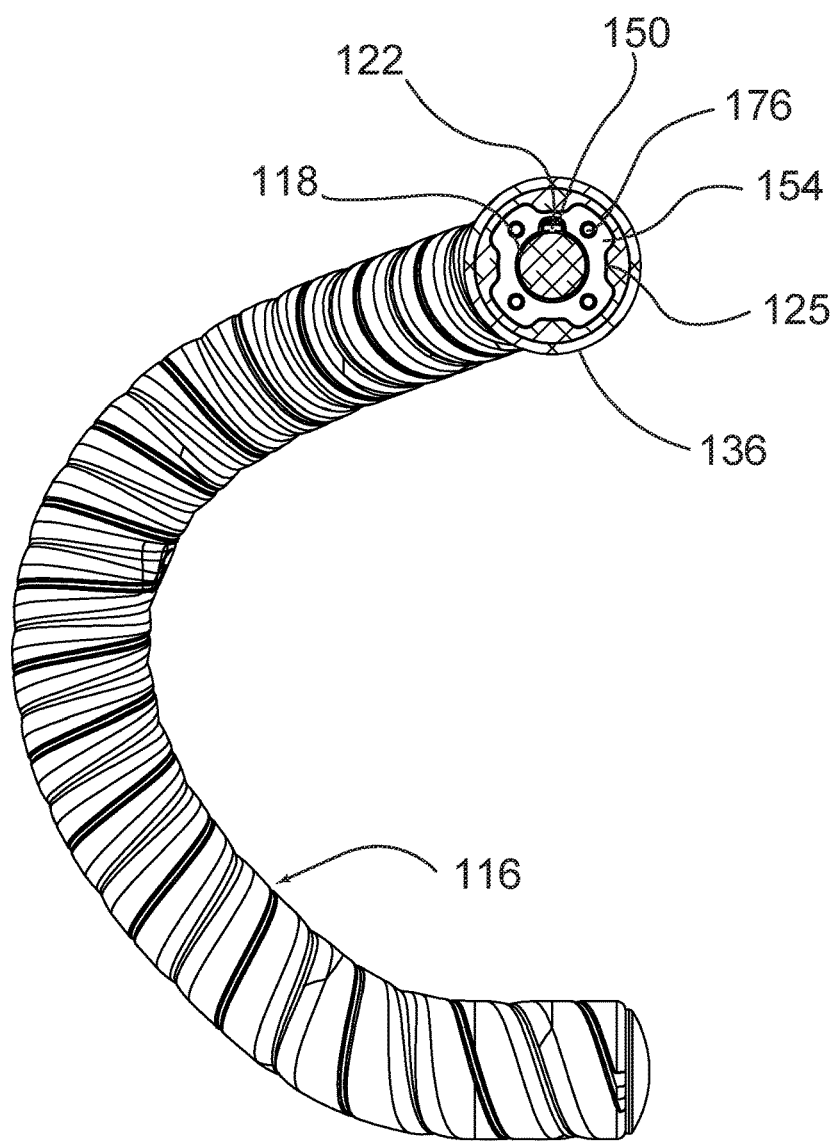
FIG. 36 depicts a side view of an implementation of detachable handlebar unit with the locking shaft embodiment of FIG. 32.

FIG. 33 an implementation is also depicted with a collar harness 179 that is configured to be disposed around the locking crown 125 and the locking teeth 154 such that the shaft collar 136 slides over the collar harness 179 and is fastened to it by a shaft collar screw 138 via a shaft collar screw hole 139. FIG. 34 depicts an exploded view of the non-limiting embodiment of the locking shaft 118 of FIG. 31-36, In FIGS. 33 and 34, the locking shaft 118 can be seen disposed within a series of compressible gaskets 162 with a rectangle dimension. In this non-limiting embodiment, the compressible gaskets 162 further comprise compressible gasket ridges 163 which are in turn configured to receive a flexible ring 165 (depicted in FIG. 32) such that the compressible gasket 162 is bound to the locking shaft 118. These flexible rings 165 may be manufactured out of any polymer, metal, metal alloy or any other material already discussed in the instant disclosure. In addition, they are not required to expand or contract, but may do so without departing form the scope of the disclosure. To illustrate, the flexible rings 165 may have a substantially rigid composition. Also, depicted in FIG. 34 is an embodiment of the locking teeth 154, specifically the locking teeth 154 in FIG. 34 have curved edges instead of the square edges seen in previous figures. It is contemplated that this is a non-limiting embodiment of the present disclosure.

Figure 37:
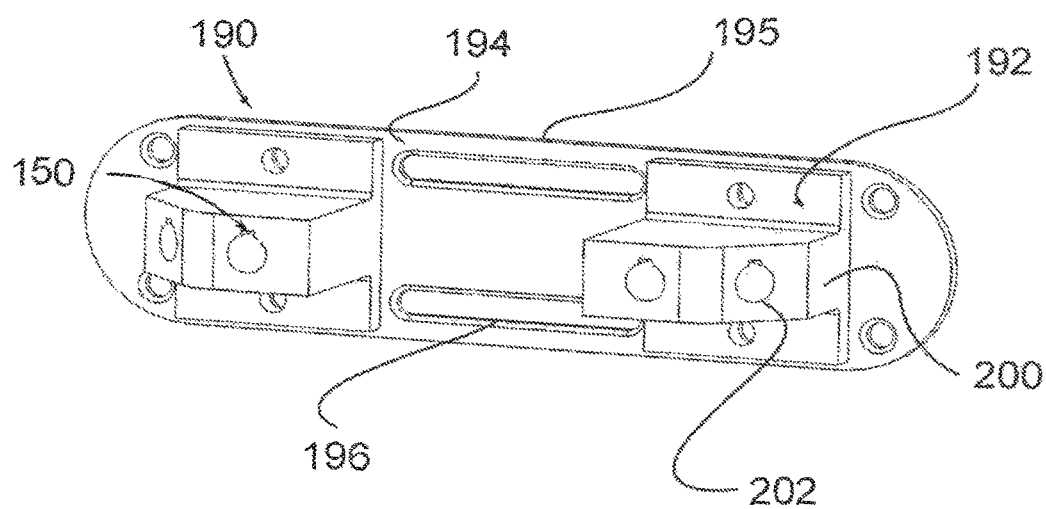
FIG. 37 depicts an implementation of a mounting bracket, mounting bracket openings, receiver brackets, and receiver openings.
Figure 38:
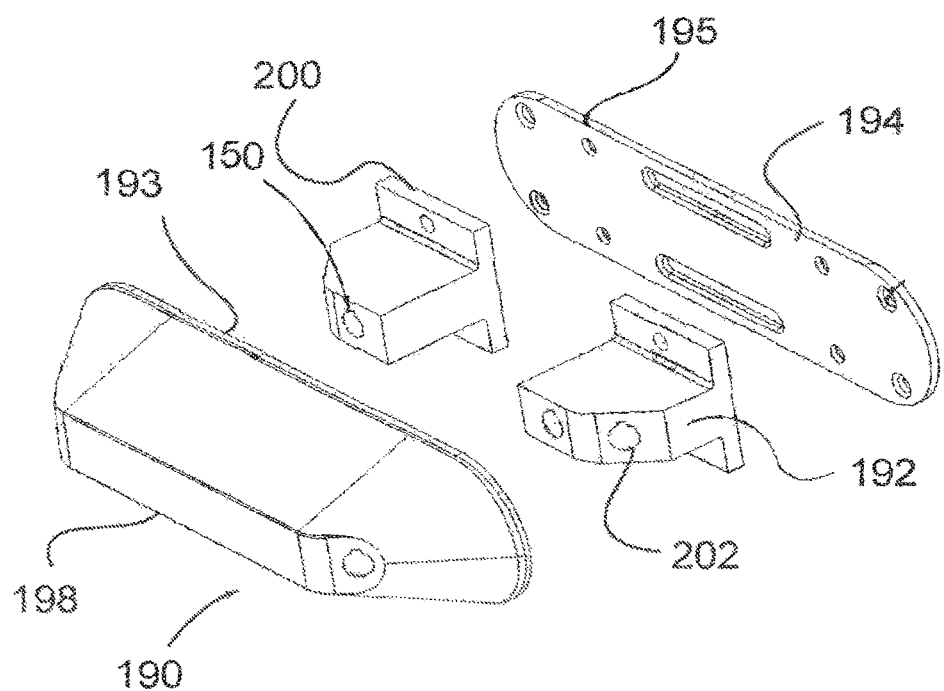
FIG. 38 depicts an implementation of a mounting bracket, mounting bracket openings, receiver brackets, receiver openings, and a face plate.
Figure 39:
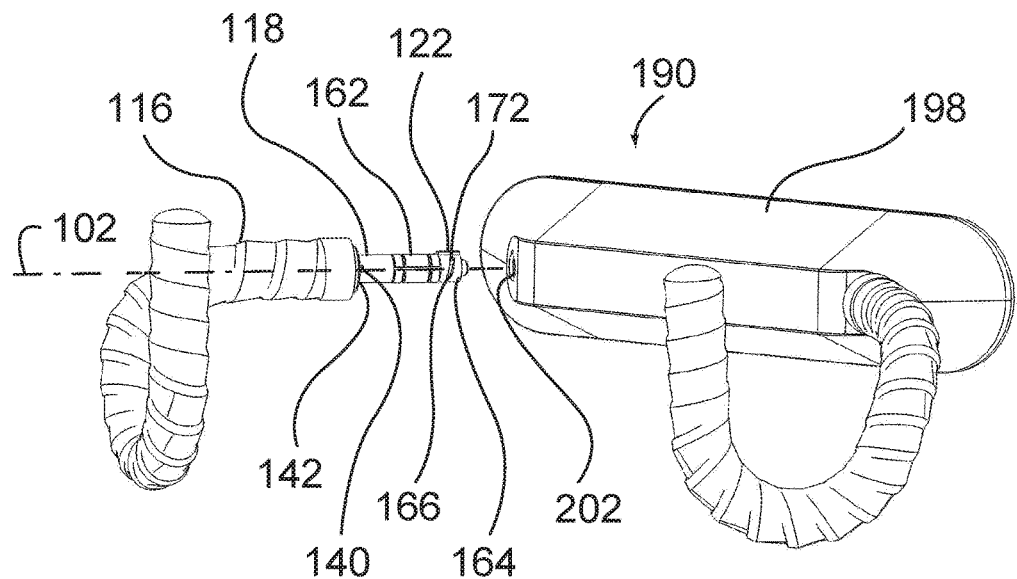
FIG. 39 depicts an implementation of a handlebar portion and a mount.
Figure 40:
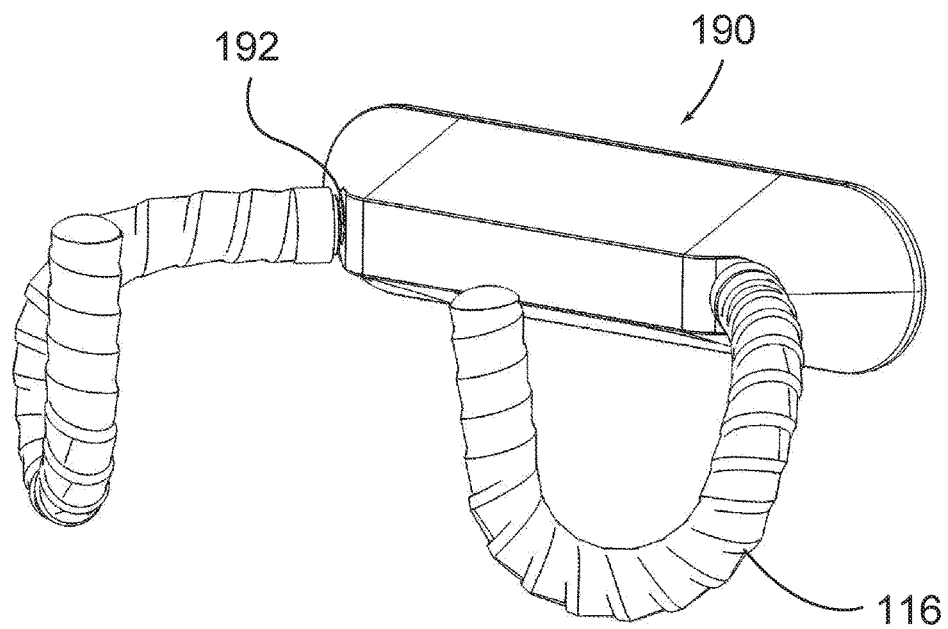
FIG. 40 depicts an implementation of handlebar portion coupled with a mount.
Figure 41:
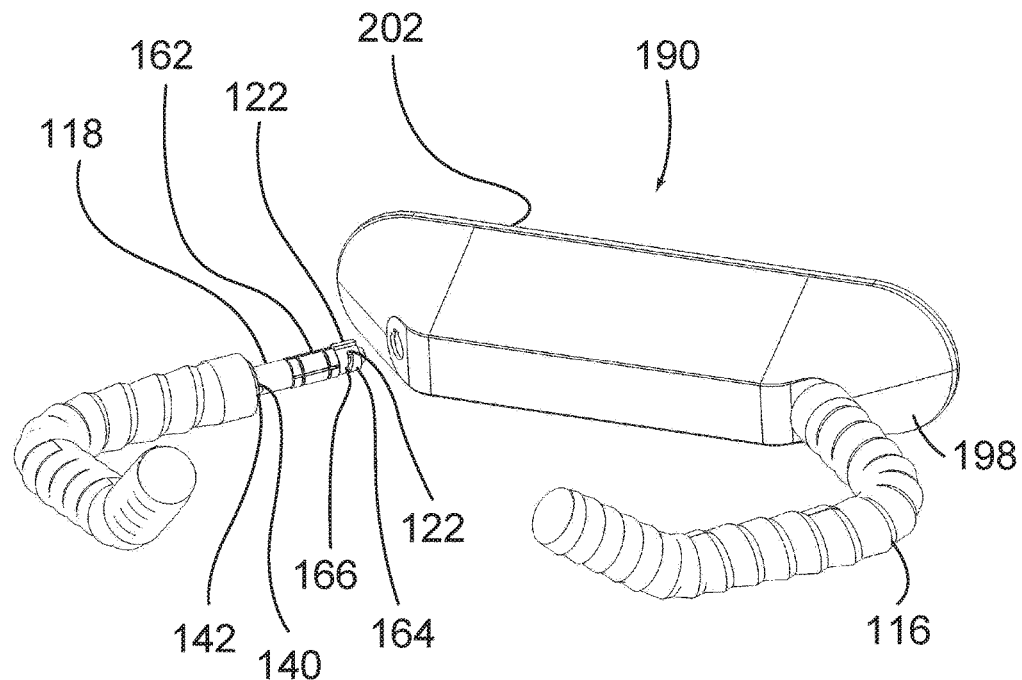
FIG. 41 depicts the implementation of FIG. 39 with different style handlebars.
Figure 42:
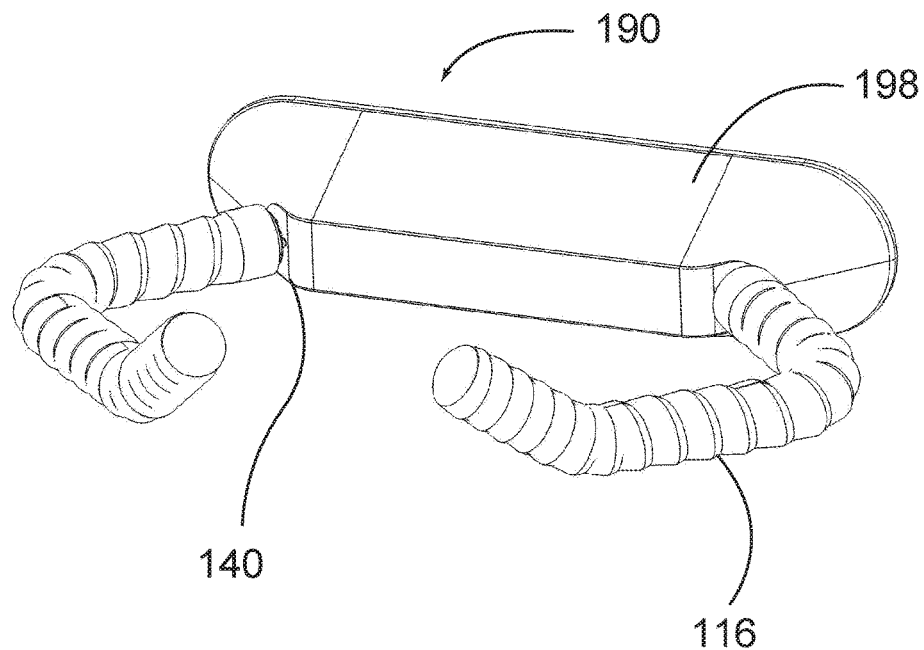
FIG. 42 depicts the implementation of FIG. 41 coupled together.
Figure 43:
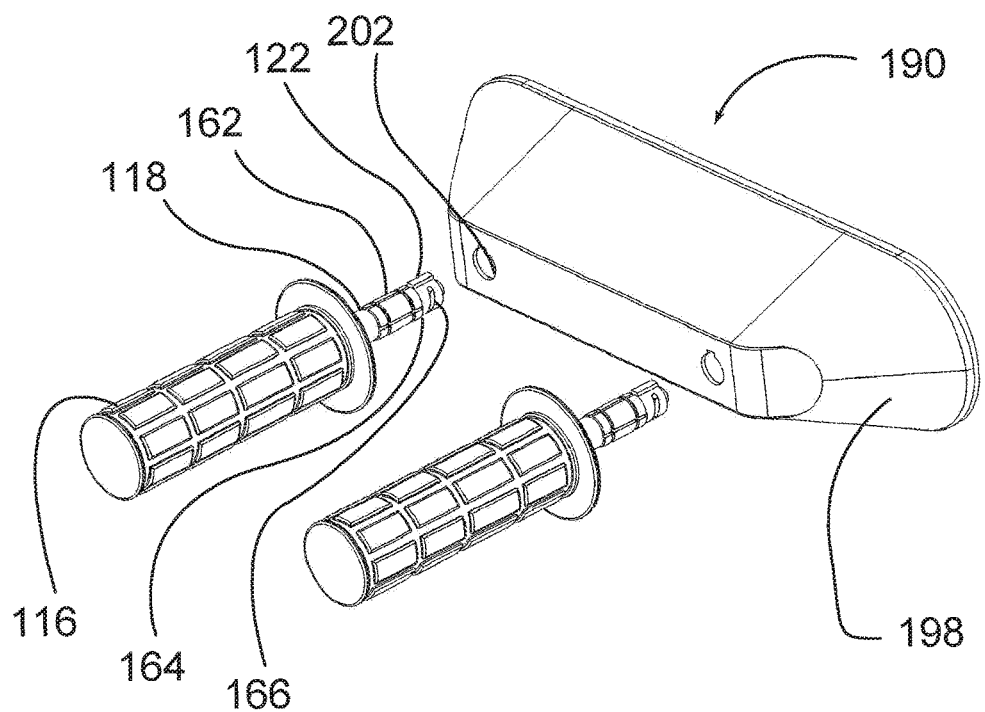
FIG. 43 depicts the implementation of FIG. 39 with different style handlebars.
Figure 44:
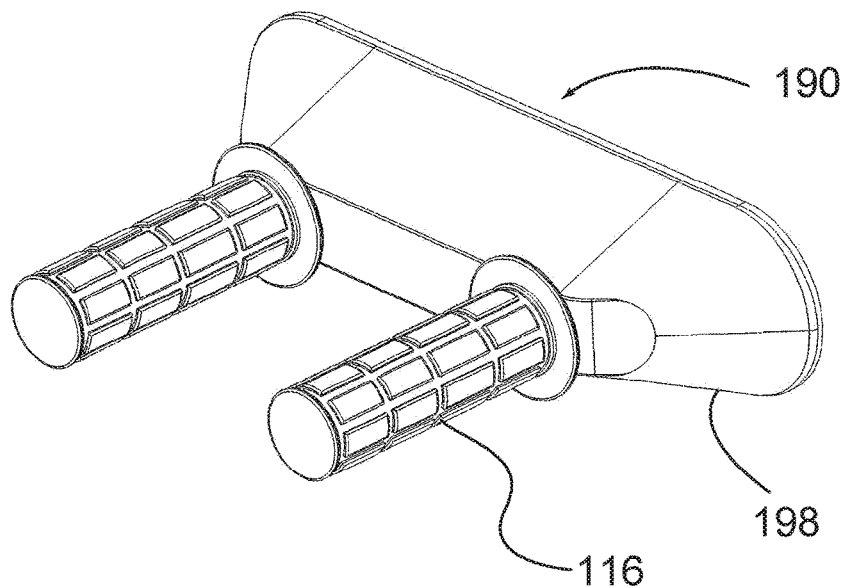
FIG. 44 depicts the implementation of FIG. 43 coupled together.

FIGS. 37-38 provide an exemplary embodiment of the components that provide for the mounting of the handlebar portion 106 to the mounting receiver assembly 192 of the mount 190 as part of the detachable handlebar system 100. In one embodiment, the handlebar portion 106 is configured to couple with the mounting receiver assembly 192. The handlebar portion 106 comprises at least part of the assembly of internal operational mechanisms 108 (see FIGS. 3-36) while the mounting receiver assembly 192 comprises a face plate 198, a receiver bracket 200, and a plurality of receiver openings 202. In this embodiment, the mount 190 is depicted as several different components. However, it is contemplated that the mount 190 could be constructed as a one-piece mount, such as by a molding process. In addition, it is contemplated that the mount can be configured to attach to a "wall" which includes, but is not substantially limited to interior surfaces, exterior surfaces, floors, and ceilings. Theoretically, the mount 190 according to the present invention may be installed on any surface, whether flat or not, as long as the mounting structure dimensions can support the mount 190.

The mount comprises the mounting receiver assembly 192 and a mounting bracket 194 such that the mounting receiver assembly 192 can be configured to attach to the mounting bracket 192. In this figure, it is not shown how the mounting receiver assembly 192 can be attached to the mounting bracket 194. However, some possible mechanisms of engagement will be described. For example, it is contemplated that some embodiments will have an outer ledge 193 that may reflect the shape of the face plate 198 such that the outer ledge will snap into a mounting bracket ledge 195 that also reflects the shape of the mounting bracket 192. Alternatively, the mounting receiver assembly 192 may be configured to attach to the mounting bracket 194 by, but not limited to, adhesive, welding, molding, fusing, or any other way of bonding metals and polymers. In addition, the receiver brackets 200 can be coupled to the mounting bracket 192 via adhesive, welding, molding, fusing, or any other way of bonding metals and polymers. The receiver brackets 200 can also be coupled to the mounting bracket 192 by unitary construction or by using a screw or pin or other fastener to fix its position on the mounting bracket 192. The face plate 198 of the mounting receiver assembly 192 is configured to be disposed around the receiver brackets 200 such that the receiver brackets 200 are hidden from view except for the plurality of receiver openings 202. The receiver openings 202 in this embodiment are each shown having a key seat 150, such that the receiver openings 202 mimic the configuration of the shaft collar 136 and receiving shaft 126 disclosed in the stem portion 104 of the detachable bicycle unit 101. Additionally, the receiver openings 202 extend through the mounting receiver assembly 192 for at least the length of the locking shaft 118 and wherein they retain the key seat 150 structure for the same length. However, it is contemplated that the receiver openings 202 may be comprised in alternate forms without departing from the scope of the disclosure. For example, the receiver openings may also comprise locking grooves 144 oriented perpendicular to the longitudinal axis 102 such that they engage with the anti-rotation tabs 140 of the locking shaft 118. It may also be contemplated that the locking grooves 144 of the mount 190 may be comprised in the face plate 198.

FIGS. 39-44 representatively illustrate various models of handlebars 116 of the handlebar portion 106 inserted into the mount 190 along the longitudinal axis 102. The mount 190 as depicted herein allows for easy attachment of a locking shaft 118, such as the one present on the handlebar portion 116. FIG. 39-44, all of which are all angled side perspectives of the handle bar portion 106 and the mount 190, shows the locking shaft 118 of the handlebar portion 106 with the embodiments of the locking shaft 118 shown in FIGS. 31-36. However, it is contemplated that the handlebar portion 106 may comprise any of the locking shaft 118 embodiments disclosed within this specification.

An exemplary method of attaching and detaching removable handlebars of a bicycle includes, but is not limited to: inserting a locking shaft 118 of a handlebar 106 portion into a receiving shaft 126 of a stem portion 104 such that a first key 123 and a second key 122 positioned on the locking shaft 118 pass through a key seat 150 of a shaft collar 136, wherein the shaft collar 136 is configured to couple to a locking crown 125 that comprises locking teeth 154 and a compression spring opening 176 then biasing the shaft collar 136 towards the locking crown 125 such that a compression spring 152 is compressed. Axially rotating the locking shaft 118 about a first axis 102 to align an anti-rotation tab 140 with a locking groove 144 within the shaft collar 136; at least partially decompressing the compression spring 152 such that the locking groove 144 engages the anti-rotation tab 140.

Detaching the locking shaft 118 from the receiving shaft 126 by biasing the locking groove 144 portion in the shaft collar 136 away from the anti-rotation tab 140 and axially rotating the locking shaft 118 about the first axis 102 and moving radially along the first axis 102 such that the locking shaft 118 is moved out of the stem portion 104.

It can be appreciated that there are various other designs and methods that can be implemented to achieve the goals of this system and method, and the terms employed in this description are given as examples and are not limiting so as to exclude alternate embodiments that could be employed to achieve the goals and inventive aspects of the disclosed invention. The embodiments recited above are given only as examples and are to be construed as such.

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:
1. A detachable handlebar apparatus, comprising:
a stem portion comprising:
   a hollow cylindrical receiver configured to attach to a bicycle, the receiver oriented along an axis;
   a locking crown positioned proximal a first end of the receiver, wherein the locking crown comprises a central opening, the locking crown further comprising:
      a receiving shaft extending away from the locking crown towards a second end of the receiver; and
      at least one locking tooth extending outward from the locking crown substantially perpendicular to the axis;
a handlebar portion comprising a first end and a second end, wherein the handlebar portion comprises:
   a hand grip, positioned at the first end of the handlebar portion;
   a locking shaft configured to extend from the hand grip along the axis through the stem portion, wherein the hollow cylindrical receiver is configured to receive the locking shaft;
   a shoulder positioned proximate a locking shaft base and between the bicycle handgrip and the locking shaft, the locking shaft being rotatable about the axis;
   at least one anti-rotation tab extending perpendicularly from the axis;
   a first key positioned on the locking shaft;
   at least one compressible gasket, wherein the compressible gasket is at least partially disposed around the locking shaft; and a peg positioned at the second end of the handlebar portion extending perpendicular to the axis; and a bushing proximate the compressible gasket, wherein the locking shaft extends through the bushing, and wherein the bushing comprises:

a guiding slot configured to receive the peg; and a second key extending perpendicular the axis.

2. The detachable handlebar apparatus of claim 1, further comprising a shaft collar, configured to couple to the locking crown, wherein the shaft collar comprises a key seat configured to receive both the first key and the second key.

3. The detachable handlebar apparatus of claim 2, wherein the guiding slot of the handlebar portion is positioned such that a first edge proximate the second key forms an acute angle relative the axis, towards the second end of the handlebar portion and a second edge proximate the shaft collar is angled towards the first end of the handlebar portion.

4. The detachable handlebar apparatus of claim 2, wherein the shaft collar further comprises at least one locking groove, configured to engage the anti-rotation tab.

5. The detachable handlebar apparatus of claim 2, wherein the shaft collar further comprises a back plate configured to couple the handlebar portion to the shaft collar, wherein the back plate extends in an outward direction from the receiving shaft substantially perpendicular to the axis.

6. The detachable handlebar apparatus of claim 5, further comprising a compression spring, positioned within the shaft collar, the compression spring configured to engage the shaft collar and locking crown such that the compression spring biases the shaft collar away from the locking crown when the shaft collar is engaged with the back plate.

7. The detachable handlebar apparatus of claim 1, further comprising a compression spring opening that extends through the at least one locking tooth.

8. The detachable handlebar apparatus of claim 1, wherein the at least one compressible gasket is configured to have a compressed configuration and an extended configuration, and the at least one compressible gasket is positioned between the shoulder and the bushing.

9. The detachable handlebar apparatus of claim 1, further comprising a locking shaft screw that extends through the locking shaft, wherein the locking shaft screw is configured to engage the locking shaft when tightened.

10. The detachable handlebar apparatus of claim 1, wherein the receiving shaft further comprises a first receiving slot that extends along at least a portion of a length of the receiving shaft and a second receiving slot that extends along a portion of a circumference of the receiving shaft.

11. The detachable handlebar apparatus of claim 10, wherein the first receiving slot is configured to receive the second key and the second receiving slot is configured to receive the first key.

12. A method for attaching and detaching removable bicycle handlebars to a bicycle, the method comprising:

inserting a locking shaft of a handlebar portion into a receiving shaft of a stem portion such that a first key and a second key positioned on the locking shaft pass through a key seat of a shaft collar, wherein the shaft collar is configured to couple to a locking crown that comprises at least one locking tooth and a compression spring opening;

biasing the shaft collar towards the locking crown such that a compression spring is compressed;

axially rotating the locking shaft about a first axis to align an anti-rotation ab with a locking groove within the shaft collar;

at least partially decompressing the compression spring such that the locking groove engages the anti-rotation tab;

detaching the locking shaft from the receiving shaft by biasing the locking groove portion in the shaft collar away from the anti-rotation tab and axially rotating the locking shaft about the first axis; and moving the handlebar portion along the first axis such that the locking shaft is moved out of the stem portion.

13. The method for attaching removable bicycle handlebars to a bicycle of claim 12, wherein axially rotating the locking shaft about the first axis includes rotating the locking shaft at least 90 degrees.

* * * * *